US012567791B2

(12) United States Patent
Jung et al.

(10) Patent No.: US 12,567,791 B2
(45) Date of Patent: Mar. 3, 2026

(54) DEVICE AND METHOD FOR DETECTING MAGNITUDE OF INPUT CURRENT OF SWITCHING CONVERTER

(71) Applicant: SAMSUNG ELECTRONICS CO., LTD., Suwon-si (KR)

(72) Inventors: Minyong Jung, Suwon-si (KR); Bongtae Min, Suwon-si (KR); Hyoungseok Oh, Suwon-si (KR); Wookwan Lee, Suwon-si (KR); Jinsoo Lee, Suwon-si (KR); Heungjun Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 231 days.

(21) Appl. No.: 18/206,280

(22) Filed: Jun. 6, 2023

(65) Prior Publication Data

US 2023/0396142 A1    Dec. 7, 2023

(30) Foreign Application Priority Data

Jun. 7, 2022    (KR) ........................ 10-2022-0068987

(51) Int. Cl.
    *H02M 1/00*        (2007.01)
(52) U.S. Cl.
    CPC ....... *H02M 1/0009* (2021.05); *H02M 1/0077* (2021.05)
(58) Field of Classification Search
    CPC .................................................. H02M 1/0009
    See application file for complete search history.

(56) References Cited

U.S. PATENT DOCUMENTS

| | | | | |
|---|---|---|---|---|
| 5,917,711 | A * | 6/1999 | Shikata | ............. H02M 3/33569 |
| | | | | 363/16 |
| 7,274,183 | B1 | 9/2007 | Gu et al. | |
| 8,749,462 | B2 | 6/2014 | Eom | |
| 9,621,018 | B2 | 4/2017 | Guenther et al. | |
| 9,886,896 | B2 | 2/2018 | Zhang et al. | |
| 2006/0015274 | A1 | 1/2006 | Trandafir et al. | |

(Continued)

FOREIGN PATENT DOCUMENTS

| | | |
|---|---|---|
| EP | 2 015 436 A1 | 1/2009 |
| KR | 10-2020-0037756 A | 4/2020 |

(Continued)

OTHER PUBLICATIONS

Extended European Search Report dated Oct. 20, 2023, issued by European Patent Office in European Patent Application No. 23178059. 4.

(Continued)

*Primary Examiner* — Gustavo A Rosario-Benitez
(74) *Attorney, Agent, or Firm* — Sughrue Mion, PLLC

(57) ABSTRACT

A device including a first switching converter configured to generate a negative supply voltage based on an input voltage; a load current sensor configured to sense a magnitude of a load current passing through a load to which the negative supply voltage is provided; and a first input current detector configured to detect a magnitude of a first input current provided to the first switching converter based on a duty cycle of the first switching converter and the magnitude of the load current.

20 Claims, 18 Drawing Sheets

(56) References Cited

U.S. PATENT DOCUMENTS

| 2009/0195230 A1* | 8/2009 | Adkins | H02M 3/156 |
| | | | 323/282 |
| 2014/0210806 A1 | 7/2014 | Hwang | |
| 2014/0300333 A1* | 10/2014 | Chen | H02M 3/156 |
| | | | 324/72 |
| 2015/0303808 A1 | 10/2015 | Ryotaro et al. | |
| 2018/0152099 A1* | 5/2018 | Savic | H02M 3/156 |
| 2019/0068054 A1 | 2/2019 | Ongaro et al. | |
| 2020/0136510 A1* | 4/2020 | Nam | H02M 3/158 |
| 2021/0159796 A1* | 5/2021 | Lee | H02M 3/158 |
| 2022/0173657 A1* | 6/2022 | Ramorini | H02M 1/0009 |
| 2022/0271652 A1* | 8/2022 | Halberstadt | H02M 1/0003 |
| 2022/0404410 A1* | 12/2022 | Nam | G01R 31/31708 |
| 2023/0016168 A1* | 1/2023 | Ramorini | H02M 1/0032 |
| 2023/0353053 A1* | 11/2023 | Ramorini | H03F 3/45475 |
| 2023/0396141 A1* | 12/2023 | Abesingha | H02M 3/158 |

FOREIGN PATENT DOCUMENTS

| KR | 10-2020-0046593 A | 5/2020 |
| KR | 10-2169381 B1 | 10/2020 |
| WO | 2021/225576 A1 | 11/2021 |

OTHER PUBLICATIONS

Communication dated Jan. 20, 2026, issued by the Korean Ministry of Intellectual Property in Korean Application No. 10-2022-0068987.

Akshaya et al., "A Fuzzy Optimized Multiport Buck Boost Converter", IOSR Journal of Electronics and Communication Engineering, 2016, pp. 80-85 (6 pages total).

* cited by examiner

DEVICE AND METHOD FOR DETECTING MAGNITUDE OF INPUT CURRENT OF SWITCHING CONVERTER

CROSS-REFERENCE TO RELATED APPLICATION

This application is based on and claims priority from Korean Patent Application No. 10-2022-0068987, filed on Jun. 7, 2022, in the Korean Intellectual Property Office, the disclosure of which is incorporated by reference herein in its entirety.

BACKGROUND

1. Field

The disclosure relates to a switching converter, and more particularly, to a device and method for detecting a magnitude of an input current of the switching converter.

2. Description of Related Art

A switching converter may be used to generate a supply voltage that provides power to various electric components, for example a load, due to a high power efficiency, and the load may operate by consuming a load current provided by the switching converter. A load may use various supply voltages, and thus, a plurality of switching converters may respectively generate a plurality of supply voltages from the same input voltage. Currents input to switching converters may include not only a current provided to a load but also a current consumed to generate supply voltages. When a switching converter consumes an excessive current, an input voltage may be reduced, and thus, it may be beneficial to accurately detect a magnitude of a current input to the switching converter.

SUMMARY

Provided is a device and method for accurately detecting a current input to a switching converter.

Additional aspects will be set forth in part in the description which follows and, in part, will be apparent from the description, or may be learned by practice of the presented embodiments.

In accordance with an aspect of the disclosure, a device includes a first switching converter configured to generate a negative supply voltage based on an input voltage; a load current sensor configured to sense a magnitude of a load current passing through a load to which the negative supply voltage is provided; and a first input current detector configured to detect a magnitude of a first input current provided to the first switching converter based on a duty cycle of the first switching converter and the magnitude of the load current.

In accordance with an aspect of the disclosure, a device includes a first switching converter configured to: generate a negative supply voltage based on an input voltage received through a first input node based on a duty cycle, output the negative supply voltage to a first output node, and output at least one signal having the duty cycle; a load current sensor configured to generate a sense voltage, wherein a voltage level of the sense voltage corresponds to a magnitude of a load current passing through a load to which the negative supply voltage is provided; and a first input current detector

2 configured to detect a magnitude of a first input current received through the first input node based on the at least one signal and the sense voltage.

In accordance with an aspect of the disclosure, a method includes generating a negative supply voltage based on a first input current by controlling at least one switch based on a duty cycle; identifying the duty cycle; detecting a magnitude of a load current passing through a load to which the negative supply voltage is provided; and detecting a magnitude of the first input current based on the duty cycle and the magnitude of the load current.

In accordance with an aspect of the disclosure, a power management integrated circuit (PMIC) includes a first switching converter configured to receive a first input current through a first input node, and to generate a negative supply voltage based on a duty cycle of the first switching converter, and to provide the negative supply voltage to a load; a second switching converter configured to generate a positive supply voltage based on a second input current received through an inductor and a second input node, and to provide the positive supply voltage to the load; and an input current controller configured to control at least one of the first switching converter and the second switching converter to reduce at least one of the first input current and the second input current based on a sum of the magnitude of the first input current and the magnitude of the second input current being greater than or equal to a threshold.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, example embodiments will be described with reference to the accompanying drawings.

As is traditional in the field, the example embodiments may be described and illustrated in terms of blocks which carry out a described function or functions. These blocks, which may be referred to herein as units, modules, circuits, blocks, converters, sensors, detectors, controllers, generators, filters, or the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
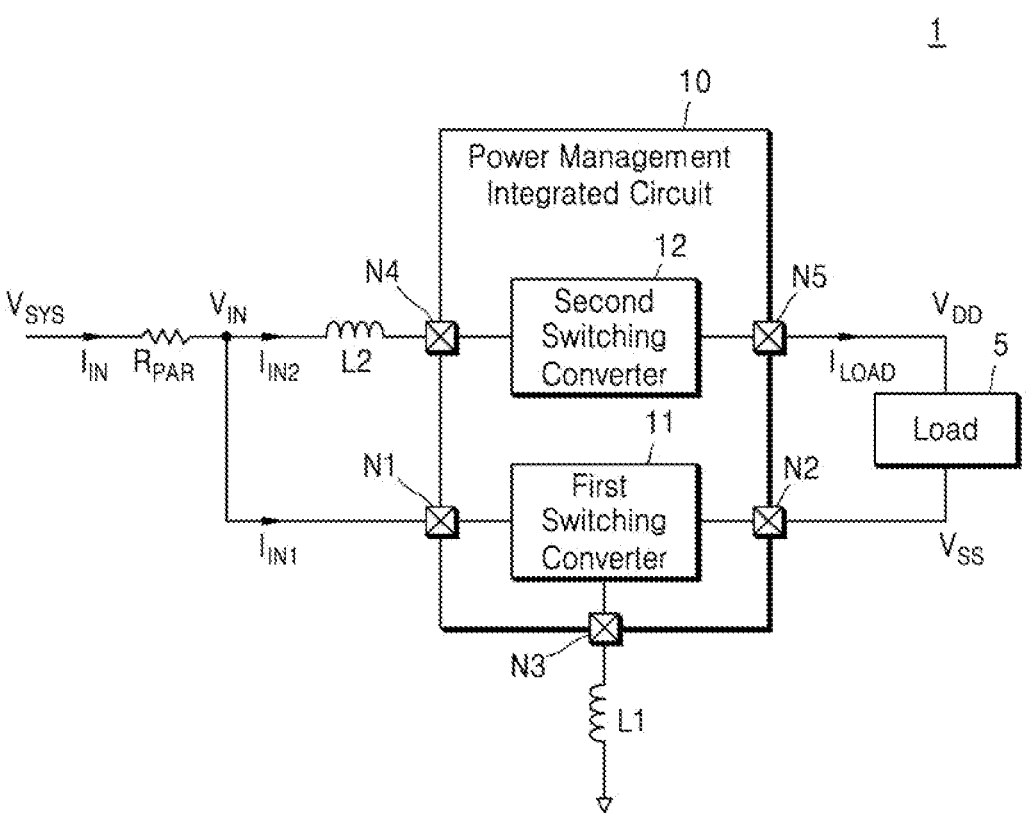
FIG. 1 is a block diagram illustrating a system according to an example embodiment.

FIG. 1 is a block diagram illustrating a system 1 according to an example embodiment. As illustrated in FIG. 1, the system 1 may include a power management integrated circuit (PMIC) 10, a load 5, a first inductor L1, and a second inductor L2. In some embodiments, the PMIC 10 may be included in a semiconductor package. In some embodiments, the system 1 may include a printed circuit board (PCB), and the PMIC 10, the load 5, the first inductor L1, and the second inductor L2 may each be mounted on the PCB. In some embodiments, at least one of the first inductor L1 and the second inductor L2 may be included in the PMIC 10. Herein, the PMIC 10 may simply be referred to as a device.

Referring to FIG. 1, the PMIC 10 may generate a positive supply voltage $V_{DD}$ and a negative supply voltage $V_{SS}$ according to an input current Inv. For example, as illustrated in FIG. 1, the PMIC 10 may include a first switching converter 11 that generates a negative supply voltage $V_{SS}$ and a second switching converter 12 that generates a positive supply voltage $V_{DD}$. The load 5 may receive the positive supply voltage $V_{DD}$ and the negative supply voltage $V_{SS}$ from the PMIC 10 and may perform a particular function by consuming a load current $I_{LOAD}$. The load 5 may refer to a certain object that performs a function based on power supplied from the PMIC 10. For example, the load 5 may also include a processing circuit that processes digital and/or analog signals, and may also include a device which converts electrical energy into another energy, such as a motor, a heater, an illuminator, or a display.

In some embodiments, the load 5 may use a wide supply voltage range to perform a designed function. For example, the load 5 may use a difference between the positive supply voltage $V_{DD}$ and the negative supply voltage $V_{SS}$, which is higher than a reference value, and the reference value may be higher than a voltage provided to the PMIC 10, that is an input voltage $V_{IN}$. In particular, when a power source of the system 1 is a battery, a voltage level of a system voltage $V_{SYS}$ provided by the power source may be limited, and accordingly, the first switching converter 11 may generate the negative supply voltage $V_{SS}$ lower than a ground potential in order to satisfy requirements of the load 5, and the second switching converter 12 may generate the positive supply voltage $V_{DD}$ higher than an input voltage $V_{IN}$. To this end, the first switching converter 11 may implement an inverting buck-boost converter together with the first inductor L1, and the second switching converter 12 may implement a boost converter together with the second inductor L2.

The first switching converter 11 may receive a first input current $I_{IN1}$ and the input voltage $V_{IN}$ through a first node N1, may output the negative supply voltage $V_{SS}$ through a second node N2, and may be connected to the first inductor L1 through a third node N3. Herein, the first node N1 may be referred to as a first input node, and the second node N2 may be referred to as a first output node. As described below with reference to FIG. 3, the first input current $I_{IN1}$ or the load current $I_{LOAD}$ may flow to the first inductor L1 according to a duty cycle of a switching cycle. Herein, the duty cycle of the switching cycle of the first switching converter 11 may be referred to as a duty cycle of the first switching converter 11. An example of the first switching converter 11 will be described below with reference to FIG. 3.

The second switching converter 12 may receive a second input current $I_{IN2}$ through a fourth node N4 and output the positive supply voltage $V_{DD}$ through a fifth node N5. Herein, the fourth node N4 may be referred to as a second input node, and the fifth node N5 may be referred to as a second output node. As described below with reference to FIG. 8, the second input current $I_{IN2}$ passing through the second inductor L2 may flow to a ground node or the fifth node N5 according to the duty cycle of the switching cycle. Herein, the duty cycle of the switching cycle of the second switching converter 12 may be referred to as a duty cycle of the second switching converter 12. An example of the second switching converter 12 will be described below with reference to FIG. 8.

When the load current $I_{LOAD}$ increases due to a change in a state of the load 5, or a current consumed by at least one of the first switching converter 11 and the second switching converter 12 increases, the input current $I_{IN}$ may increase. As illustrated in FIG. 1, the input current $I_{IN}$ may correspond to the sum of the first input current $I_{IN1}$ and the second input current $I_{IN2}$, and when at least one of the first input current $I_{IN1}$ and the second input current $I_{IN2}$ increases, the input current $I_{IN}$ may increase. As illustrated in FIG. 1, due to parasitic resistance $R_{PAR}$ of a path between the system voltage $V_{SYS}$ and the input voltage $V_{IN}$, the input voltage $V_{IN}$ may be lower than the system voltage $V_{SYS}$ ($V_{IN} < V_{SYS}$), and when the input current $I_{IN}$ increases, a larger voltage drop may occur. When the input voltage $V_{IN}$ decreases, at least one of the positive supply voltage $V_{DD}$, the negative supply voltage $V_{SS}$, and the load current $I_{LOAD}$ may change, which may cause an abnormal operation of the load 5. In order to prevent the input voltage $V_{IN}$ from decreasing, a magnitude of the input current IN, that is, the first input current $I_{IN1}$ and the second input current $I_{IN2}$, may be detected, and when the magnitude of the input current $I_{IN}$ is greater than a threshold, the PMIC 10 may perform an appropriate operation to reduce the input current $I_{IN}$. Accordingly, it may be beneficial to accurately detect magnitudes of the first input current $I_{IN1}$ and the second input current $I_{IN2}$. In particular, detecting a magnitude of the first input current $I_{IN1}$ may not be easy due to a wide variation range of the negative supply voltage $V_{SS}$ and a duty cycle.

As described below with reference to the drawings, the magnitude of the first input current $I_{IN1}$ provided to the first switching converter 11 that generates the negative supply voltage $V_{SS}$ may be detected based on the load current $I_{LOAD}$ and the duty cycle of the first switching converter 11. Accordingly, even when input and output conditions of the first switching converter 11 change, the magnitude of the first input current $I_{IN1}$ may be accurately detected. In addition, a magnitude of the second input current $I_{IN2}$ provided to the second switching converter 12 that generates the positive supply voltage $V_{DD}$ may be detected based on a value sampled and held in a period in which the second input current $I_{IN2}$ decreases. Accordingly, the magnitude of the first input current $I_{IN1}$ and the magnitude of the second input current $I_{IN2}$ may be accurately detected by a simple structure. As a result, a cost, for example, an area, power, and so on for detecting the magnitude of the input current $I_{IN}$ may be reduced. In addition, because at least one of the positive supply voltage $V_{DD}$ and the negative supply voltage $V_{SS}$ may be adjusted relatively early, for example relatively soon after a change in at least one of the input current IN and the input voltage $V_{IN}$, at least one of the PMIC 10 and the load 5 may be effectively prevented from abnormally operating.

Figure 2:
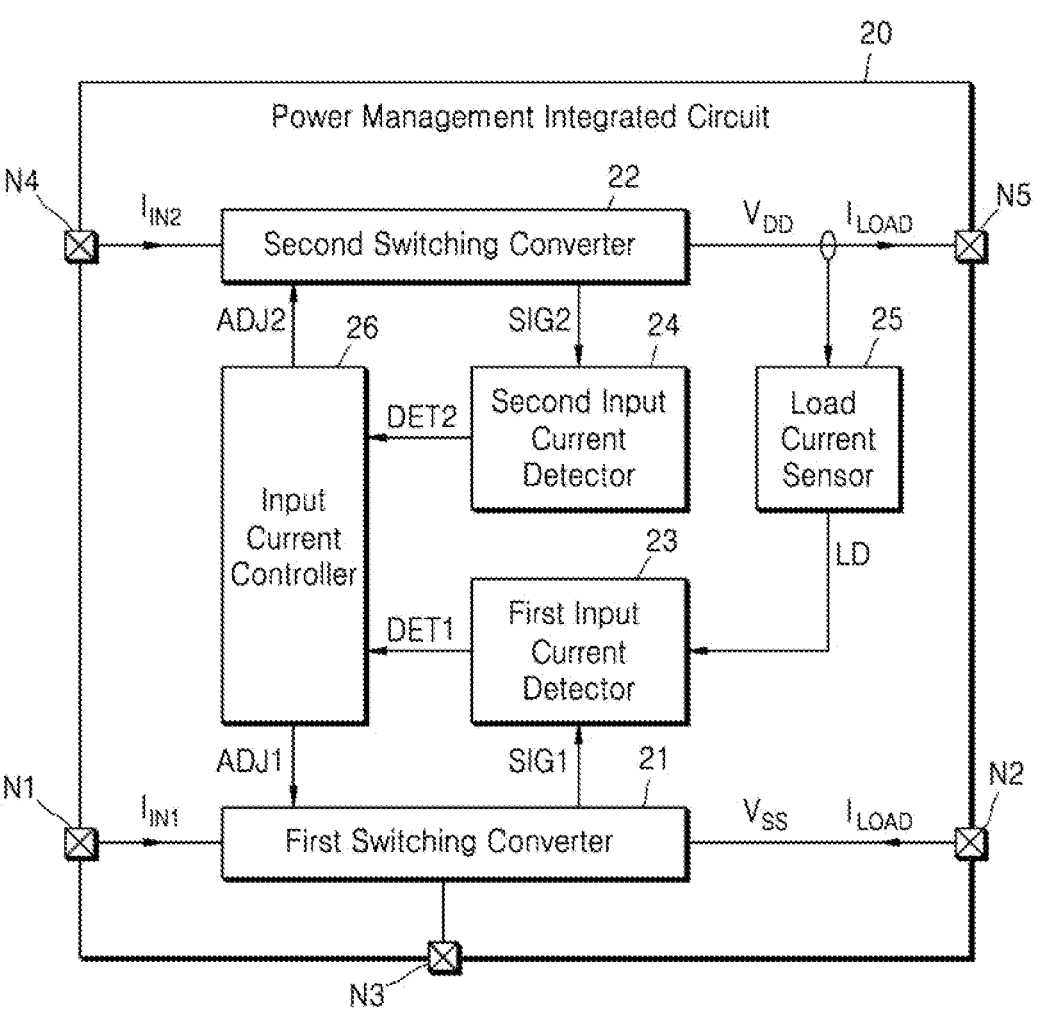
FIG. 2 is a block diagram illustrating a power management integrated circuit (PMIC) according to an example embodiment.

FIG. 2 is a block diagram illustrating a PMIC 20 according to an example embodiment. As described above with reference to FIG. 1, the PMIC 20 may receive a first input current $I_{IN1}$ through a first node N1 and receive a load current $I_{LOAD}$ through a second node N2 and may be connected to the first inductor L1 of FIG. 1 through a third node N3. In addition, the PMIC 20 may receive a second input current $I_{IN2}$ through a fourth node N4 and output the load current $I_{LOAD}$ through a fifth node N5. Hereinafter, in describing FIG. 2, redundant descriptions which may overlap the descriptions given above for FIG. 1 may be omitted.

Referring to FIG. 2, the PMIC 20 may include a first switching converter 21, a second switching converter 22, a first input current detector 23, a second input current detector 24, a load current sensor 25, and an input current controller 26. The first switching converter 21 may generate the negative supply voltage $V_{SS}$ based on the first input current $I_{IN1}$ and receive the load current $I_{LOAD}$. The second switching converter 22 may generate the positive supply voltage $V_{DD}$ based on the second input current $I_{IN2}$ and output the load current $I_{LOAD}$. The load 5 of FIG. 1 may operate based on the positive supply voltage $V_{DD}$ and the negative supply voltage $V_{SS}$ provided from the PMIC 20, and thus, as illustrated in FIG. 2, the load current $I_{LOAD}$ received by the first switching converter 21 and the load current $I_{LOAD}$ output from the second switching converter 22 may be equal.

The load current sensor 25 may sense the load current $I_{LOAD}$. For example, as illustrated in FIG. 2, the load current sensor 25 may sense the load current $I_{LOAD}$ output from the second switching converter 22. In some embodiments, the load current sensor 25 may also sense the load current $I_{LOAD}$ received by the first switching converter 21. The load current sensor 25 may provide a load signal LD corresponding to a magnitude of the sensed load current $I_{LOAD}$ to the first input current detector 23. In some embodiments, as described below with reference to FIG. 5, the load signal LD may be a voltage corresponding to the magnitude of the load current $I_{LOAD}$. The load current sensor 25 may have any structure for sensing the load current $I_{LOAD}$.

The first input current detector 23 may detect a magnitude of the first input current $I_{IN1}$. For example, as illustrated in FIG. 2, the first input current detector 23 may receive at least one first signal SIG1 from the first switching converter 21, and receive the load signal LD from the load current sensor 25. The first input current detector 23 may identify a duty cycle of the first switching converter 21 based on at least one first signal SIG1. In addition, the first input current detector 23 may identify a magnitude of the load current $I_{LOAD}$ based on the load signal LD. As described below with reference to FIGS. 3 and 4, a magnitude of the first input current $I_{IN1}$ may be calculated based on the duty cycle of the first switching converter 21 and the magnitude of the load current $I_{LOAD}$. Accordingly, the first input current detector 23 may detect the magnitude of the first input current $I_{IN1}$ based on the identified duty cycle and the magnitude of the load current $I_{LOAD}$ and provide a first detection signal DET1 to the input current controller 26 corresponding to the detected magnitude. The first input current $I_{IN1}$ may change in a switching cycle of the first switching converter 21, and the first input current detector 23 may detect an average magnitude of the first input current $I_{IN1}$. An example of the first input current detector 23 will be described below with reference to FIG. 5.

The second input current detector 24 may detect a magnitude of the second input current $I_{IN2}$. For example, as illustrated in FIG. 2, the second input current detector 24 may receive at least one second signal SIG2 from the second switching converter 22. The second input current detector 24 may identify a period in which the second input current $I_{IN2}$ decreases in a switching cycle, based on at least one second signal SIG2. As described below with reference to FIGS. 8 and 9, the magnitude of the second input current $I_{IN2}$ may be calculated based on a value sampled and held in a period in which the second input current $I_{IN2}$ decreases. Accordingly, the second input current detector 24 may detect the magnitude of the second input current $I_{IN2}$ by performing sampling and holding in the period in which the identified second input current $I_{IN2}$ decreases, and may provide a second detection signal DET2 corresponding to the detected magnitude to the input current controller 26. The second input current $I_{IN2}$ may change in a switching cycle of the second switching converter 22, and the second input current detector 24 may detect an average magnitude of the second input current $I_{IN2}$. An example of the second input current detector 24 will be described below with reference to FIG. 8.

The input current controller 26 may identify a magnitude of the input current Inv and limit the input current $I_{IN1}$ based on the magnitude of the input current $I_{IN}$. For example, as illustrated in FIG. 2, the input current controller 26 may receive the first detection signal DET1 from the first input current detector 23 and the second detection signal DET2 from the second input current detector 24. The input current controller 26 may identify the magnitude of the first input current $I_{IN1}$n based on the first detection signal DET1, and identify the magnitude of the second input current $I_{IN2}$ based on the second detection signal DET2. The input current controller 26 may identify the magnitude of the input current $I_{IN}$ by summing the identified magnitude of the first input current $I_{IN1}$ and the identified magnitude of the second input current $I_{IN2}$.

The input current controller 26 may compare the identified magnitude of the input current $I_{IN}$ with the predefined threshold, which may be for example a predefined or predetermined threshold magnitude, and when the magnitude of the input current $I_{IN}$ is greater than or equal to the threshold, the input current controller 26 may control at least one of the first switching converter 21 and the second switching converter 22 to limit the magnitude of the input current $I_{IN}$. For example, as illustrated in FIG. 2, the input current controller 26 may provide a first adjustment signal ADJ1 to the first switching converter 21, and the first switching converter 21 may change a voltage level of the negative supply voltage $V_{SS}$ based on the first adjustment signal ADJ1. In some embodiments, the first adjustment signal ADJ1 may change a voltage level of a first reference voltage used by the first switching converter 21 to generate the negative supply voltage $V_{SS}$. In addition, the input current controller 26 may provide a second adjustment signal ADJ2 to the second switching converter 22, and the second switching converter 22 may change a voltage level of the positive supply voltage $V_{DD}$ based on the second adjustment signal ADJ2. In some embodiments, the second adjustment signal ADJ2 may change a voltage level of a second reference voltage used by the second switching converter 22 to generate the positive supply voltage $V_{DD}$.

Figure 3:
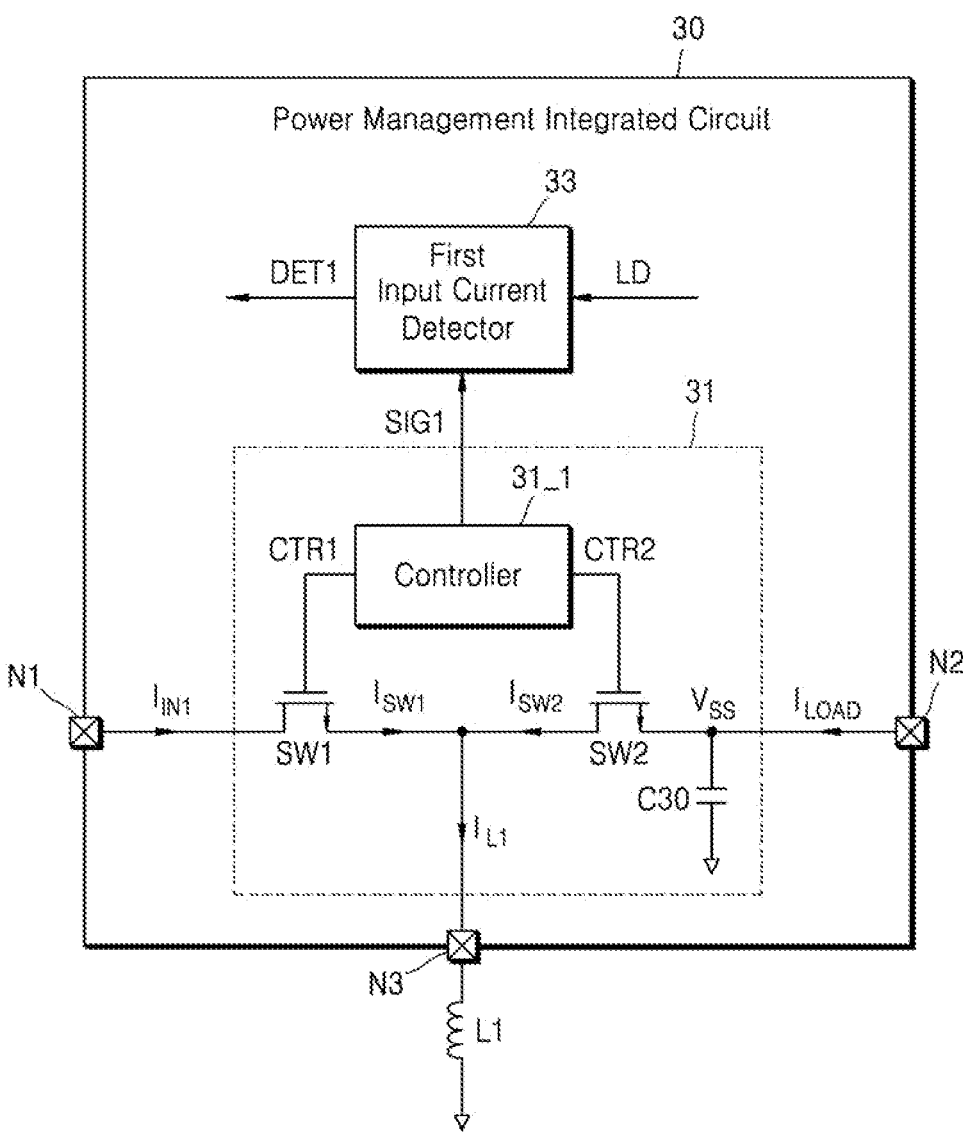
FIG. 3 is a block diagram illustrating a PMIC according to an example embodiment.
Figure 4:
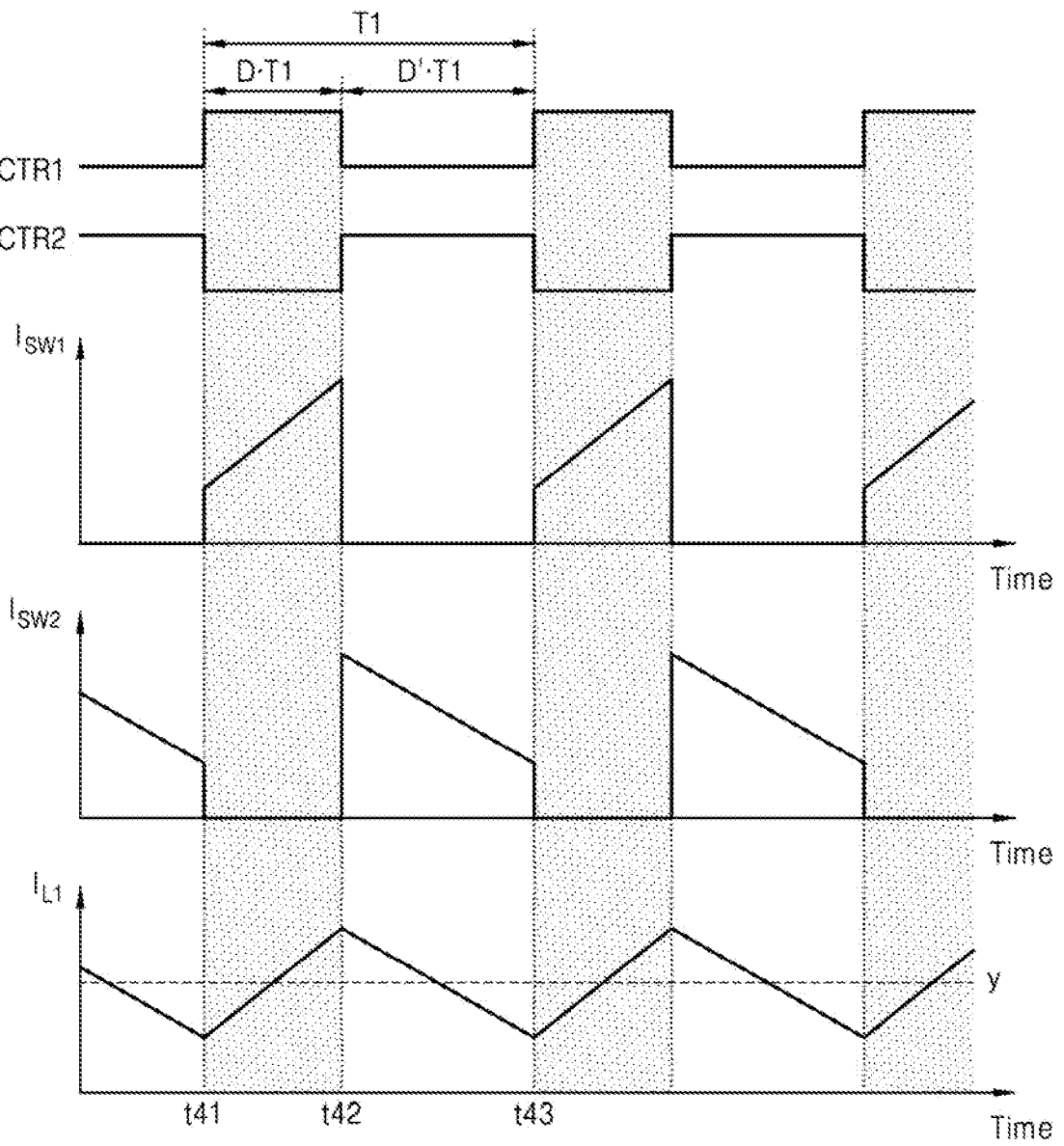
FIG. 4 is a timing diagram illustrating an example of an operation of the PMIC of FIG. 3, according to an example embodiment.

FIG. 3 is a block diagram illustrating a PMIC 30 according to an example embodiment, and FIG. 4 is a timing diagram illustrating an example of an operation of the PMIC 30 of FIG. 3 according to an example embodiment. For example, the block diagram of FIG. 3 illustrates a first switching converter 31 and a first input current detector 33 included in the PMIC 30 together with the first inductor L1. Hereinafter, in describing FIG. 3, redundant descriptions which may overlap the above descriptions may be omitted.

Referring to FIG. 3, the first switching converter 31 may receive a first input current $I_{IN1}$ through a first node N1 and receive a load current $I_{LOAD}$ through a second node N2. The first switching converter 31 may include a first switch SW1, a second switch SW2, a controller 31_1, and a capacitor C30. In some embodiments, the first switching converter 31 may further include at least one component not illustrated in FIG. 3. In addition, it is noted that a first switching converter according to an example embodiment is not limited to the first switching converter 31 of FIG. 3.

The first switch SW1 may be turned on or off in response to a first switch control signal CTR1 provided from the controller 31_1. For example, the first switch SW1 may be turned on in response to an activated first switch control signal CTR1 to allow the first input current $I_{IN1}$ to pass therethrough. In addition, the first switch SW1 may be turned off in response to a deactivated first switch control signal CTR1 to block the first input current $I_{IN1}$.

The second switch SW2 may be turned on or off in response to a second switch control signal CTR2 from the controller 31_1. For example, the second switch SW2 may be turned on in response to an activated second switch control signal CTR2 to allow the load current $I_{LOAD}$ to pass therethrough. In addition, the second switch SW2 may be turned off in response to a deactivated second switch control signal CTR2 to block the load current $I_{LOAD}$.

Although FIG. 3 illustrates that each of the first switch SW1 and the second switch SW2 includes an n-type field effect transistor (NFET), example embodiments are not limited thereto. For example, each of the first switch SW1 and the second switch SW2 may include a p-channel field effect transistor (PFET) and may include a transistor having a structure different from a structure of a FET, for example, a bipolar junction transistor (BJT). In addition, in some embodiments, each of the first switch SW1 and the second switch SW2 may also include two or more transistors connected in series with and/or parallel to each other.

The controller 31_1 may mutually exclusively activate the first switch control signal CTR1 and the second switch control signal CTR2. Accordingly, the first input current $I_{IN1}$ may flow through the first inductor L1 while the first switch SW1 is turned on, and the load current $I_{LOAD}$ may flow through the first inductor L1 while the second switch SW2 is turned on. As illustrated in FIG. 3, each of the first switch SW1 and the second switch SW2 may include an NFET, and thus, the first switch control signal CTR1 and the second switch control signal CTR2 of FIG. 3. may be active-high signals. Herein, the controller 31_1 included in the first switching converter 31 may be referred to as a first controller.

Referring to FIG. 4, from time t41 to time t42, the first switch control signal CTR1 may be activated and the second switch control signal CTR2 may be deactivated. Accordingly, a current $I_{SW1}$ passing through the first switch SW1 and a current $I_{L1}$ passing through the first inductor L1 may gradually increase, while a current $I_{SW2}$ passing through the second switch SW2 may be approximately zero.

From time t42 to time t43, the first switch control signal CTR1 may be deactivated, and the second switch control signal CTR2 may be activated. Accordingly, the current $I_{SW2}$ passing through the second switch SW2 and the current $I_{L1}$ passing through the first inductor L1 may be gradually reduced, while the current $I_{SW1}$ passing through the first switch SW1 may be approximately zero.

In a switching cycle of the first switching converter 31, that is, in a first period T1, a duty cycle D may correspond to a duty cycle of the first switch control signal CTR1. Accordingly, as illustrated in FIG. 4, a period in which the first switch control signal CTR1 is activated (which may be a period in which the second switch control signal CTR2 is deactivated) may be represented as D·T1, and a period in which the first switch control signal CTR1 is deactivated (which may be a period in which the second switch control signal CTR2 is activated) may b D'·T1 (where D'=1−D).

As illustrated in FIG. 4, when a median value (or an average value) of the current $I_{L1}$ passing through the first inductor L1 is referred to as y, the current $I_{L1}$ passing through the first inductor L1 in the period in which the second switch control signal CTR2 is activated may be equal to the load current $I_{LOAD}$, and thus, the load current $I_{LOAD}$ may be calculated as in Equation 1 below.

$$I_{LOAD} = y \cdot D' \tag{Equation 1}$$

In addition, the current $I_{L1}$ passing through the first inductor L1 in the period in which the first switch control signal CTR1 is activated may be equal to the first input current $I_{IN1}$, and thus, the first input current $I_{IN1}$ may be calculated as in Equation 2 below.

$$I_{IN1} = y \cdot D = I_{LOAD} \cdot D/D' \tag{Equation 2}$$

Referring back to FIG. 3, the controller 31_1 may provide at least one first signal SIG1 to the first input current detector 33. In some embodiments, the controller 31_1 may provide the first input current detector 33 with at least one of a first signal having the same duty cycle as a duty cycle D (which may be referred to as a first duty cycle herein) of the first switch control signal CTR1, and a first signal having the same duty cycle as a duty cycle D' (which may be referred to as a second duty cycle herein) of the second switch control signal CTR2. In other words, in some embodiments the controller 311 may provide the first input current detector 33 with a first signal, and the first signal may have a duty cycle which is the same as at least one of the first duty cycle and the second duty cycle. The first input current detector 33 may identify the first duty cycle D and the second duty cycle D' based on at least one first signal SIG1. In some embodiments, when receiving one first signal from the controller 31_1, the first input current detector 33 may invert the received first signal, and identify the first duty cycle D and the second duty cycle D' based on the received first signal and the inverted first signal. In addition, the first input current detector 33 may identify a magnitude of the load current $I_{LOAD}$ based on the load signal LD, thereby detecting a magnitude of the first input current $I_{IN1}$ based on Equation 2, and generating the first detection signal DET1. An example of the first input current detector 33 for detecting the magnitude of the first input current $I_{IN1}$ based on Equation 2 will be described below with reference to FIG. 5.

Figure 5:
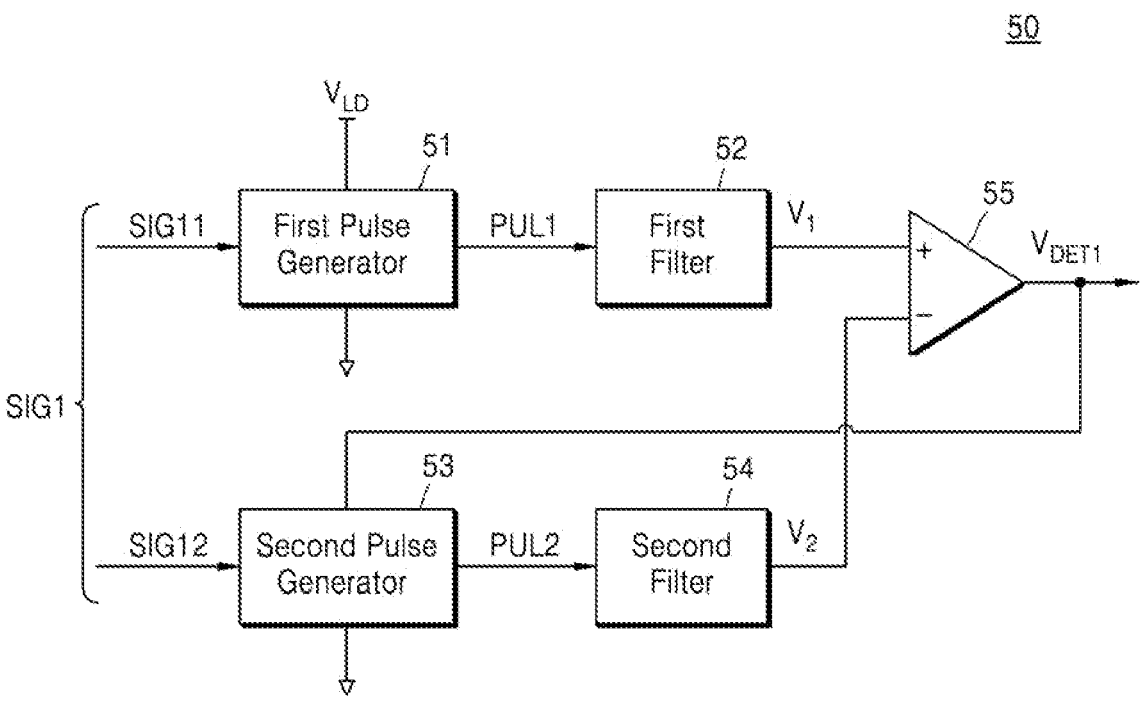
FIG. 5 is a block diagram illustrating a first input current detector according to an example embodiment.
Figure 6:
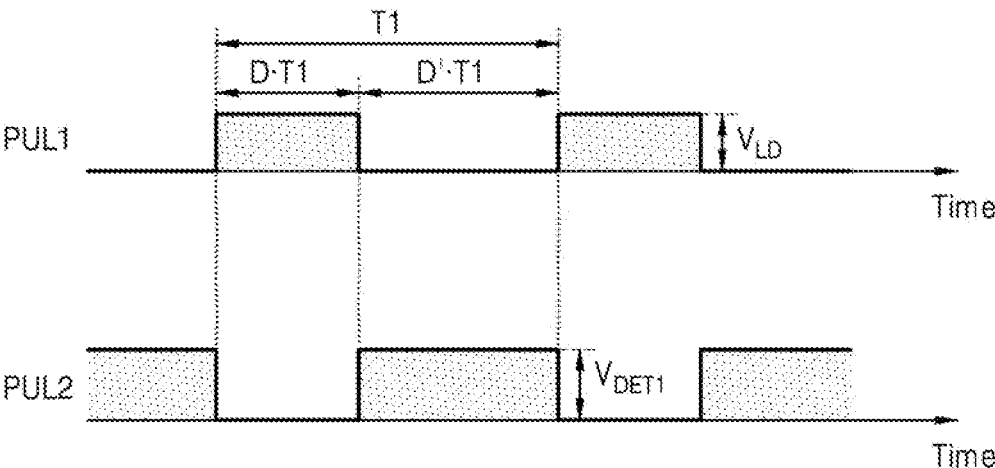
FIG. 6 is a timing diagram illustrating examples of a first pulse and a second pulse of FIG. 5, according to an example embodiment.

FIG. 5 is a block diagram illustrating a first input current detector 50 according to an example embodiment, and FIG. 6 is a timing diagram illustrating an example of a first pulse PUL1 and a second pulse PUL2 of FIG. 5, according to an example embodiment. As described above with reference to the drawings, the first input current detector 50 of FIG. 5 may detect the magnitude of the first input current $I_{IN1}$ based on a magnitude of the load current $I_{LOAD}$ and a duty cycle of the first switching converter. Hereinafter, FIGS. 5 and 6 will be described with reference to FIG. 2.

Referring to FIG. 5, the first input current detector 50 may include a first pulse generator 51, a first filter 52, a second pulse generator 53, a second filter 54, and an amplifier 55. The first input current detector 50 may receive a voltage $V_{LD}$ as the load signal LD of FIG. 2. For example, the load current sensor 25 may generate a voltage $V_{LD}$ corresponding to a magnitude of the sensed load current $I_{LOAD}$ as the load signal LD, and as the load current $I_{LOAD}$ increases, the voltage $V_{LD}$ may also increase. In addition, the first input current detector 50 may generate an output voltage $V_{DET1}$ as the first detection signal DET1 of FIG. 2. As the detected magnitude of the first input current $I_{IN1}$ increases, the output voltage $V_{DET1}$ may also increase.

Referring to FIG. 5, at least one first signal SIG1 may include a first signal SIG11 having a first duty cycle D and a first signal SIG12 having a second duty cycle D'. In some embodiments, the first input current detector 50 may receive only one of the two first signals SIG11 and SIG12 and generate an inverted signal from the received signal.

The first pulse generator 51 may generate the first pulse PUL1 from the first signal SIG11 having the first duty cycle D based on the voltage $V_{LD}$. Referring to FIG. 6, the first pulse PUL1 may have a peak corresponding to the voltage $V_{LD}$ and have the first duty cycle D. Accordingly, in FIG. 6, an area under the first pulse PUL1 may be proportional to a product of the first duty cycle D and the voltage $V_{LD}$.

The first filter 52 may generate a first voltage $V_1$ by filtering the first pulse PUL1. For example, the first filter 52 may include a low pass filter, and thus, the first voltage $V_1$ may have a magnitude corresponding to the area under the first pulse PUL1 in FIG. 6. Because the voltage $V_{LD}$ has a voltage level corresponding to a magnitude of the load current $I_{LOAD}$, the first voltage $V_1$ has a voltage level corresponding to a product of the first duty cycle D and the magnitude of the load current $I_{LOAD}$.

The second pulse generator 53 may generate the second pulse PUL2 based on the output voltage $V_{DET1}$ from the first signal SIG12 having the second duty cycle D'. Referring to FIG. 6, the second pulse PUL1 may have a peak corresponding to the output voltage $V_{DET1}$ and have a second duty cycle D'. Accordingly, in FIG. 6, an area under the second pulse PUL2 may be proportional to a product of the second duty cycle D' and the output voltage $V_{DET1}$. In some embodiments, the second pulse generator 53 may have the same structure as the first pulse generator 51.

The second filter 54 may generate the second voltage $V_2$ by filtering the second pulse PUL2. For example, the second filter 54 may include a low pass filter, and thus, in FIG. 6, the second voltage $V_2$ may have a voltage level corresponding to the area under the second pulse PUL2. Because the output voltage $V_{DET1}$ has a voltage level corresponding to a magnitude of the first input current $I_{IN1}$, the second voltage $V_2$ may have a voltage level corresponding to a product of the second duty cycle D' and the magnitude of the first input current $I_{IN1}$. In some embodiments, the second filter 54 may have the same structure as the first filter 52.

The amplifier 55 may include a non-inverting input terminal receiving the first voltage $V_1$ and an inverting input terminal receiving the second voltage $V_2$. The amplifier 55 may generate the output voltage $V_{DET1}$ by amplifying a difference between the first voltage $V_1$ and the second voltage $V_2$. As illustrated in FIG. 5, the output voltage $V_{DET1}$ of the amplifier 55 may be provided back to the second pulse generator 53, and thus, the first voltage $V_1$ may be approximately equal to the second voltage $V_2$. As described above, the first voltage $V_1$ may correspond to a product of the first duty cycle D and the load current $I_{LOAD}$, and the second voltage $V_2$ may correspond to a product of the second duty cycle D' and the first the input current $I_{IN1}$, and thus, the following Equation 3 may be obtained.

$$I_{LOAD} \cdot D = I_{IN1} \cdot D' \qquad \text{(Equation 3)}$$

Equation 3 may correspond to Equation 2, and thus, the output voltage $V_{DET1}$ may represent a magnitude of the first input current $I_{IN1}$.

Figure 7A:
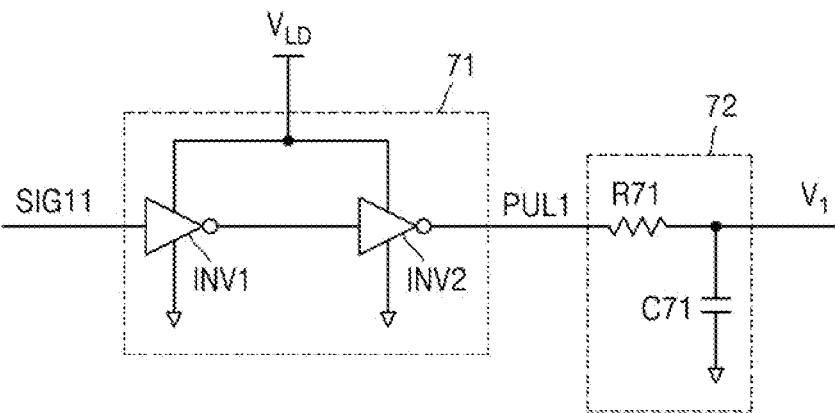
FIGS. 7A and 7B are circuit diagrams illustrating examples of a pulse generator and a filter according to example embodiments.
Figure 7B:
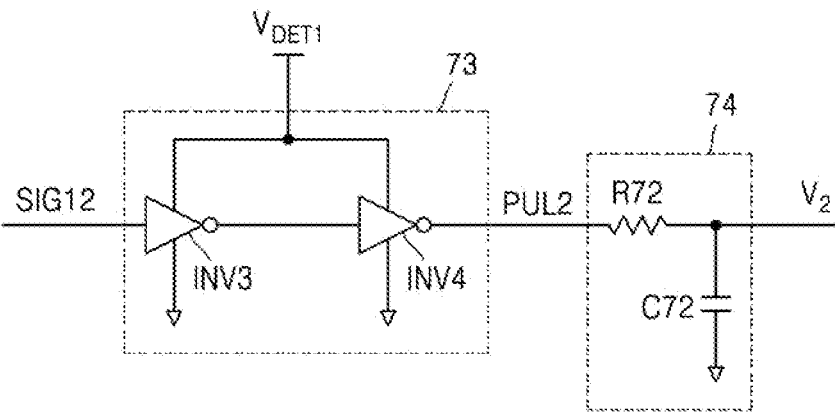

FIGS. 7A and 7B are circuit diagrams illustrating examples of a pulse generator and a filter according to example embodiments. For example, the block diagram of FIG. 7A illustrates an example of the first pulse generator 51 and the first filter 52 of FIG. 5, and the block diagram of FIG. 7B illustrates an example of the second pulse generator 53 and the second filter 54 of FIG. 5.

Referring to FIG. 7A, a first pulse generator 71 may receive a first signal SIG11 having a first duty cycle D and generate a first pulse PUL1. In some embodiments, the first pulse generator 71 may include an inverter chain that receives the first signal SIG11 having the first duty cycle D and receives a voltage $V_{LD}$ as a positive supply voltage. For example, as illustrated in FIG. 7A, the first pulse generator 71 may include a first inverter INV1 and a second inverter INV2. The first inverter INV1 and the second inverter INV2 may receive the voltage $V_{LD}$ proportional to a load current $I_{LOAD}$ as a positive supply voltage. Accordingly, the first pulse PUL1 may have the same duty cycle and phase as the first signal SIG11 having the first duty cycle D and have a peak corresponding to the voltage $V_{LD}$. In some embodiments, the first pulse generator 71 may include four or more even-numbered inverters. In some embodiments, when a first input current detector receives only a first signal SIG12 having a second duty cycle D' from a first switching converter, an output signal output from a third inverter INV3 of FIG. 7B to be described below may be provided to an input terminal of the first pulse generator 71, that is, an input terminal of the first inverter INV1.

A first filter 72 may receive the first pulse PUL1 and output a first voltage $V_1$. As illustrated in FIG. 7A, the first filter 72 may include a first resistor R71 and a first capacitor C71, and the first voltage $V_1$ may be generated at a node in which the first resistor R71 is connected to the first capacitor C71. Accordingly, the first filter 72 may operate as a low pass filter having a cutoff frequency defined by resistance of the first resistor R71 and capacitance of the first capacitor C71. In some embodiments, the first filter 72 may also include a higher-order low pass filter.

Referring to FIG. 7B, a second pulse generator 73 may receive the first signal SIG12 having the second duty cycle D' and generate a second pulse PUL2. In some embodiments, the second pulse generator 73 may include an inverter chain that receives the first signal SIG12 having the second duty cycle D' and receives an output voltage $V_{DET1}$ as a positive supply voltage. For example, as illustrated in FIG. 7B, the second pulse generator 73 may include a third inverter INV3 and a fourth inverter INV4. The third inverter INV3 and the fourth inverter INV4 may receive the output voltage $V_{DET1}$ proportional to a first input current $I_{IN}$ as a positive supply voltage. Accordingly, the second pulse PUL2 may have the same duty cycle and phase as the first signal SIG12 having the second duty cycle D' and have a peak corresponding to the output voltage $V_{DET1}$. In some embodiments, the second pulse generator 73 may include four or more even-numbered inverters. In some embodiments, when a first input current detector receives only the first signal SIG11 having the first duty cycle D from a first switching converter, an output signal output from the first inverter INV1 of FIG. 7A described above may be provided to an input terminal of the second pulse generator 73, that is, an input terminal of the third inverter INV3.

A second filter 74 may receive the second pulse PUL2 and output a second voltage $V_2$. As illustrated in FIG. 7B, the second filter 74 may include a second resistor R72 and a second capacitor C72, and a second voltage $V_2$ may be generated at a node in which the second resistor R72 is connected to the second capacitor C72. Accordingly, the second filter 74 may operate as a low pass filter having a cutoff frequency defined by resistance of the second resistor R72 and capacitance of the second capacitor C72. In some embodiments, the second filter 74 may include a higher-order low pass filter.

Figure 8:
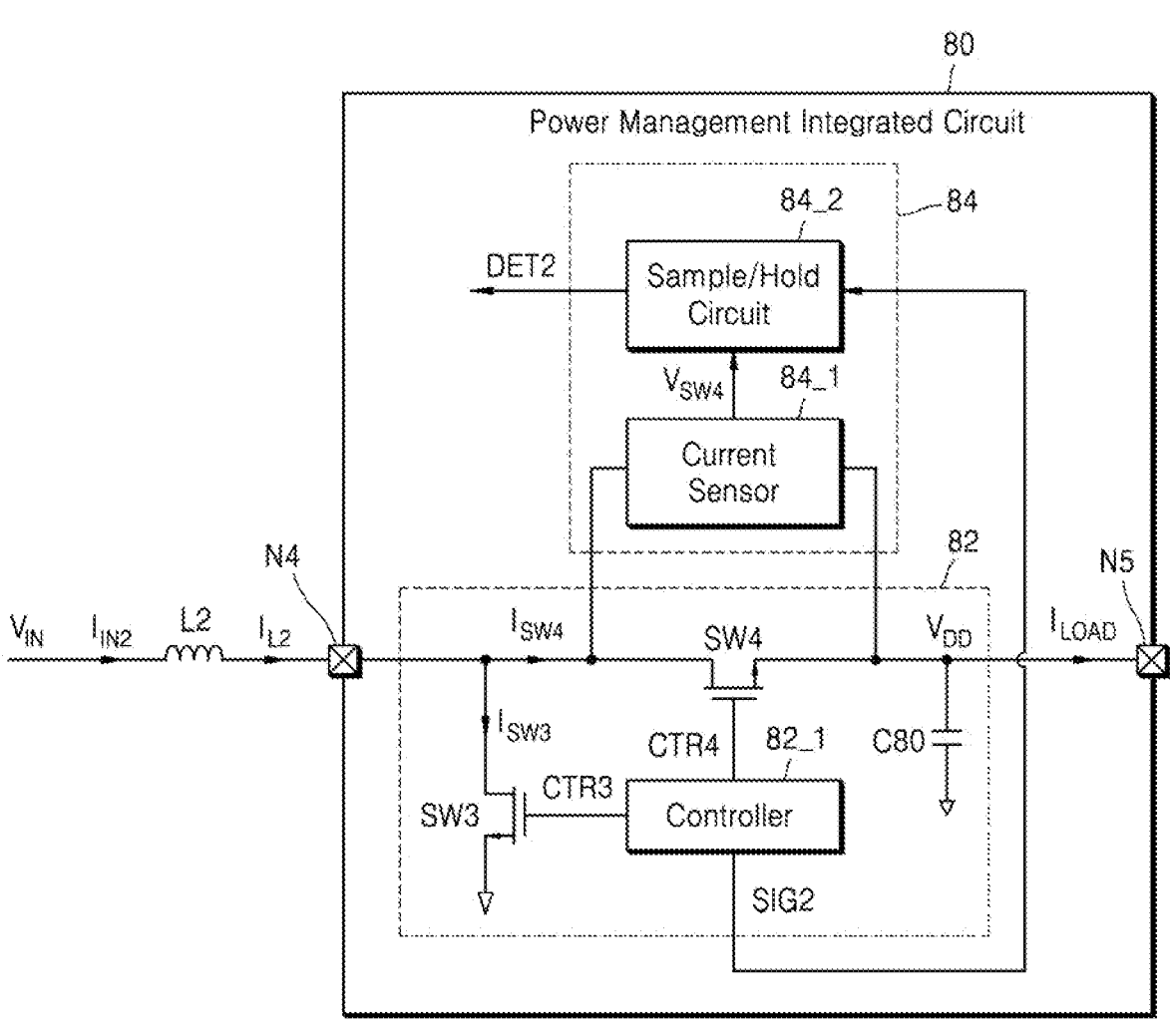
FIG. 8 is a block diagram illustrating a PMIC according to an example embodiment.
Figure 9:
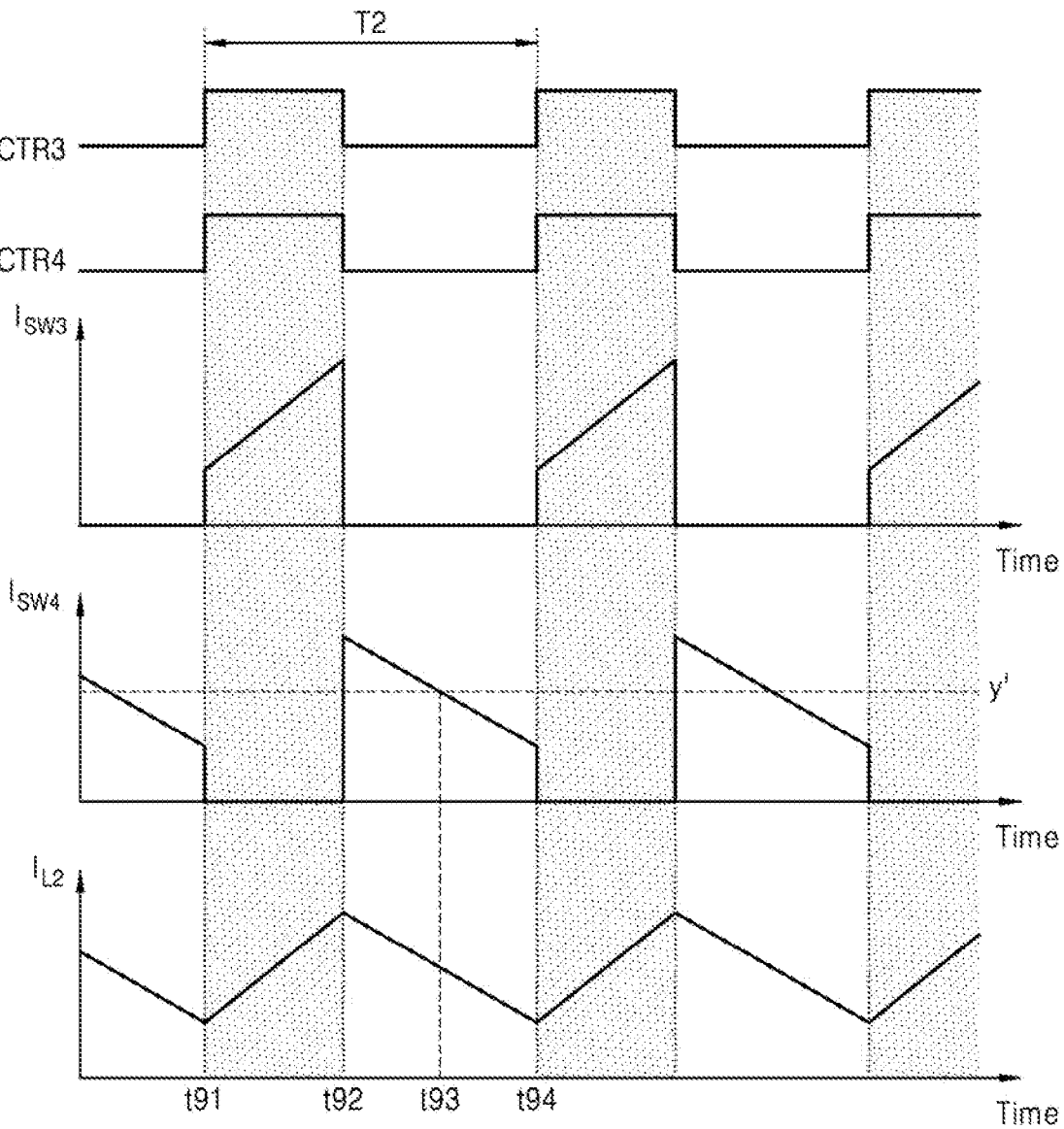
FIG. 9 is a timing diagram illustrating an example of an operation of the PMIC of FIG. 8, according to an example embodiment.

FIG. 8 is a block diagram illustrating a PMIC 80 according to an example embodiment, and FIG. 9 is a timing diagram illustrating an example of an operation of the PMIC 80 of FIG. 8 according to an example embodiment. For example, the block diagram of FIG. 8 illustrates a second switching converter 82 and a second input current detector 84 included in the PMIC 80 together with the second inductor L2. Hereinafter, in describing FIG. 8, redundant descriptions which may overlap the above descriptions may be omitted.

Referring to FIG. 8, the second switching converter 82 may receive the second input current $I_{IN2}$ through a fourth node N4 and output a load current $I_{LOAD}$ through a fifth node N5. The second switching converter 82 may include a third switch SW3, a fourth switch SW4, a controller 82_1, and a capacitor C80. In some embodiments, the second switching converter 82 may further include at least one component not illustrated in FIG. 8. In addition, it is noted that the second switching converter 82 according to example embodiments is not limited to the second switching converter 82 of FIG. 8.

The third switch SW3 may be turned on or off in response to a third switch control signal CTR3 provided from the controller 82_1. For example, the third switch SW3 may be turned on in response to an activated third switch control signal CTR3 to allow the second input current $I_{IN2}$ to pass therethrough. In addition, the third switch SW3 may be turned off in response to a deactivated third switch control signal CTR3 to block the second input current $I_{IN2}$.

The fourth switch SW4 may be turned on or off in response to a fourth switch control signal CTR4 provided from the controller 82_1. For example, the fourth switch SW4 may be turned on in response to an activated fourth switch control signal CTR4 to allow the second input current $I_{IN2}$ to pass therethrough. In addition, the fourth switch SW4 may be turned off in response to a deactivated fourth switch control signal CTR4 to block the second input current $I_{IN2}$.

Although FIG. 8 illustrates that the third switch SW3 includes an NFET and the fourth switch SW4 includes a PFET, example embodiments are not limited thereto. For example, the third switch SW3 may include a PFET, and the fourth switch SW4 may include an NFET, and each of the third switch SW3 and the fourth switch SW4 may include a transistor having a different structure from the FET, such as a BJT. In addition, in some embodiments, each of the third switch SW3 and the fourth switch SW4 may include two or more transistors connected in series with and/or parallel to each other.

The controller 821 may mutually exclusively activate the third switch control signal CTR3 and the fourth switch control signal CTR4. Accordingly, while the third switch SW3 is turned on, the second input current $I_{IN2}$, that is, a current $I_{L2}$ passing through the second inductor L2, may flow to the ground node, and while the fourth switch SW4 is turned on, the current $I_{L2}$ passing through the second inductor L2 may flow to the capacitor C80 and the fifth node N5. As illustrated in FIG. 8, the third switch SW3 may include an NFET, and thus, the third switch control signal CTR3 may become an active-high signal. In addition, as illustrated in FIG. 8, the fourth switch SW4 may include a PFET, and thus, the fourth switch control signal CTR4 may become an active-low signal. In some embodiments, the controller 821 may also generate the fourth control signal CTR4 that is the same as the third control signal CTR3. Herein, the controller 82_1 included in the second switching converter 82 may be referred to as a second controller.

Referring to FIG. 9, from time t91 to time t92, the third switch control signal CTR3 may be activated and the fourth switch control signal CTR4 may be deactivated. Accordingly, a current $I_{SW3}$ passing through the third switch SW3 and the current $I_{L2}$ passing through the second inductor L2 may gradually increase, and a current $I_{SW4}$ passing through the fourth switch SW4 may be approximately zero.

From time t92 to time t94, the third switch control signal CTR3 may be deactivated and the fourth switch control signal CTR4 may be activated. Accordingly, the current $I_{SW4}$ passing through the fourth switch SW4 and the current $I_{L2}$ passing through the second inductor L2 may be gradually reduced, and the current $I_{SW3}$ passing through the third switch SW3 may be approximately zero.

The third switch control signal CTR3 and the fourth switch control signal CTR4 may be activated and deactivated in a switching cycle of the second switching converter 82, that is, a second cycle T2. In some embodiments, an average magnitude of the second input current $I_{IN2}$ may be detected in a period in which the second input current $I_{IN2}$, that is, the current $I_{L2}$ passing through the second inductor L2, decreases. In a period in which the third switch control signal CTR3 is activated and the fourth switch control signal CTR4 is deactivated, the current $I_{L2}$ passing through the second inductor L2, that is, the second input current $I_{IN2}$, may be distorted differently from FIG. 9, and thus, it may not be easy to sense the second input current $I_{IN2}$ in the corresponding period, and an error may occur. As illustrated in FIG. 9, in a period in which the third switch control signal CTR3 is deactivated and the fourth switch control signal CTR4 is activated and in a period in which the current $I_{L2}$ passing through the second inductor L2 decreases, the second input current $I_{IN2}$ may be sampled, and thus, a magnitude of the second input current $I_{IN2}$ may be accurately detected. For example, as illustrated in FIG. 9, at time t93 between the time t92 and the time t94, the current $I_{SW4}$ passing through the fourth switch SW4 may be sampled, and a magnitude of the second input current $I_{IN2}$ may be detected based on the sampled value.

Referring back to FIG. 8, the second input current detector 84 may include a current sensor 84_1 and a sample/hold circuit 84_2. The current sensor 84_1 may sense the current $I_{SW4}$ passing through the fourth switch SW4. For example, as illustrated in FIG. 8, the current sensor 84_1 may be connected to both terminals of the fourth switch SW4 to sense the current $I_{SW4}$ based on a voltage between both terminals of the fourth switch SW4. The current sensor 84_1 may provide a voltage $V_{SW4}$ corresponding to the sensed magnitude of the current $I_{SW4}$ passing through the fourth switch SW4 to the sample/hold circuit 84_2. Accordingly, the voltage $V_{SW4}$ may have the same waveform as the current $I_{SW4}$ of FIG. 9.

The sample/hold circuit 84_2 may receive at least one second signal SIG2 from the second switching converter 82. As described above, a magnitude of the second input current $I_{IN2}$ may be detected in a period in which the third control signal CTR3 is deactivated and the fourth control signal CTR4 is activated, that is, a period in which the current $I_{L2}$ (or the second input current $I_{IN2}$) passing through the second inductor L2. The controller 82_1 of the second switching converter 82 may provide at least one second signal having the same duty cycle as the third switch control signal CTR3 to the sample/hold circuit 84_2, and the sample/hold circuit 84_2 may identify a period in which the current $I_{L2}$ passing through the second inductor L2 decreases, based on the at least one second signal.

The sample/hold circuit 84_2 may sample the voltage $V_{SW4}$, which is provided from the current sensor 84_1, at the center of the period identified by at least one second signal SIG2, for example at time t93 as shown in FIG. 9, and hold the sampled voltage. The sample/hold circuit 84_2 may identify a magnitude of the second input current $I_{IN2}$ based on the sampled and held voltage and may output a second detection signal DET2 indicating the identified magnitude of the second input current $I_{IN2}$.

In embodiments, any of the elements described above with respect to FIGS. 1-3, 5, 7A-7B, and 8 may be combined in any configuration, and any elements may be added or removed as desired. For example, in embodiments one or more of the elements of the PMIC 30, the PMIC 80, and the PMIC 20 may be combined.

Figure 10:
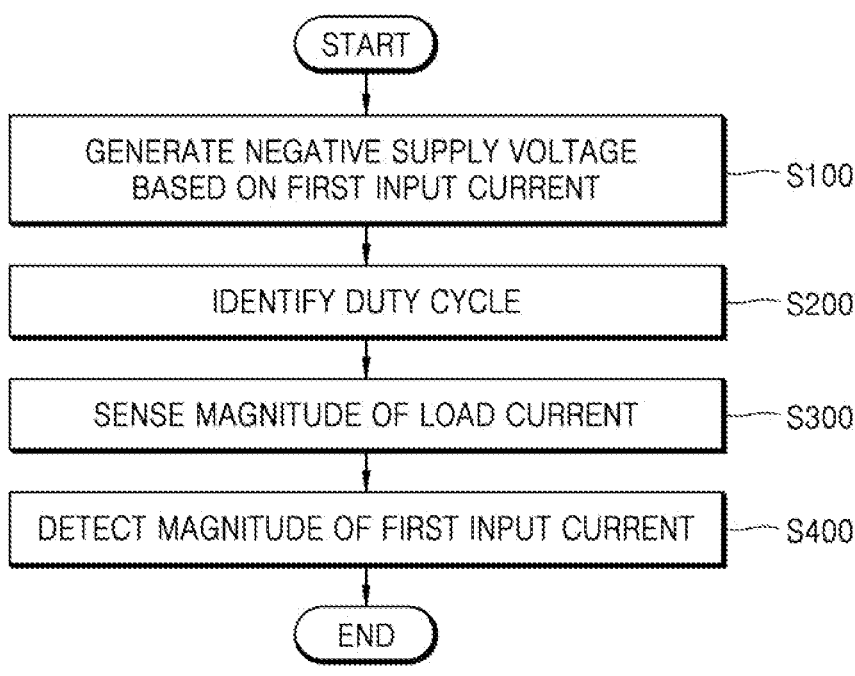
FIG. 10 is a flowchart illustrating a method of detecting a magnitude of an input current of a switching converter, according to an example embodiment.

FIG. 10 is a flowchart illustrating a method of detecting a magnitude of an input current of a switching converter, according to an example embodiment. For example, the flowchart of FIG. 10 illustrates a method of detecting a magnitude of the first input current $I_{IN1}$ of FIG. 1. As illustrated in FIG. 10, the method of detecting the magnitude of the first input current $I_{IN1}$ may include a plurality of operations S100 to S400. In some embodiments, the method of FIG. 10 may be performed by the PMIC 20 of FIG. 2, as described below with reference to FIG. 2.

Referring to FIG. 10, the negative supply voltage $V_{SS}$ may be generated based on the first input current $I_{IN1}$ in operation S100. For example, the first switching converter 21 may output the negative supply voltage $V_{SS}$ through the second node N2 by using the first input current $I_{IN1}$ received through the first node N1 and the inductor connected to the third node N3. In some embodiments, the first switching converter 21 may be included in an inverting buck-boost converter. An example of operation S100 will be described below with reference to FIG. 11.

In operation S200, a duty cycle may be identified. For example, the first switching converter 21 may generate the negative supply voltage $V_{SS}$ based on a duty cycle of a switching cycle, and the first switching converter 21 may provide at least one first signal SIG1 having the duty cycle of the switching cycle to the first input current detector 23. The first input current detector 23 may identify at least one duty cycle. An example of operation S200 will be described below with reference to FIG. 11.

In operation S300, a magnitude of the load current $I_{LOAD}$ may be sensed. For example, the load current sensor 25 may sense the load current $I_{LOAD}$ output from at least one of the second switching converter 22 and the load current $I_{LOAD}$ received by the first switching converter 21. The load current sensor 25 may generate the load signal LD corresponding to the sensed magnitude of the load current $I_{LOAD}$. In some embodiments, the load signal LD may include a voltage (for example, $V_{LD}$ of FIG. 5) corresponding to the sensed magnitude of the load current $I_{LOAD}$.

In operation S400, a magnitude of the first input current $I_{IN1}$n may be detected. For example, the first input current detector 23 may detect the magnitude of the first input current $I_{IN1}$ based on the duty cycle identified in operation S200 and the magnitude of the load current $I_{LOAD}$ sensed in operation S300. An example of operation S400 will be described below with reference to FIG. 12.

Figure 11:
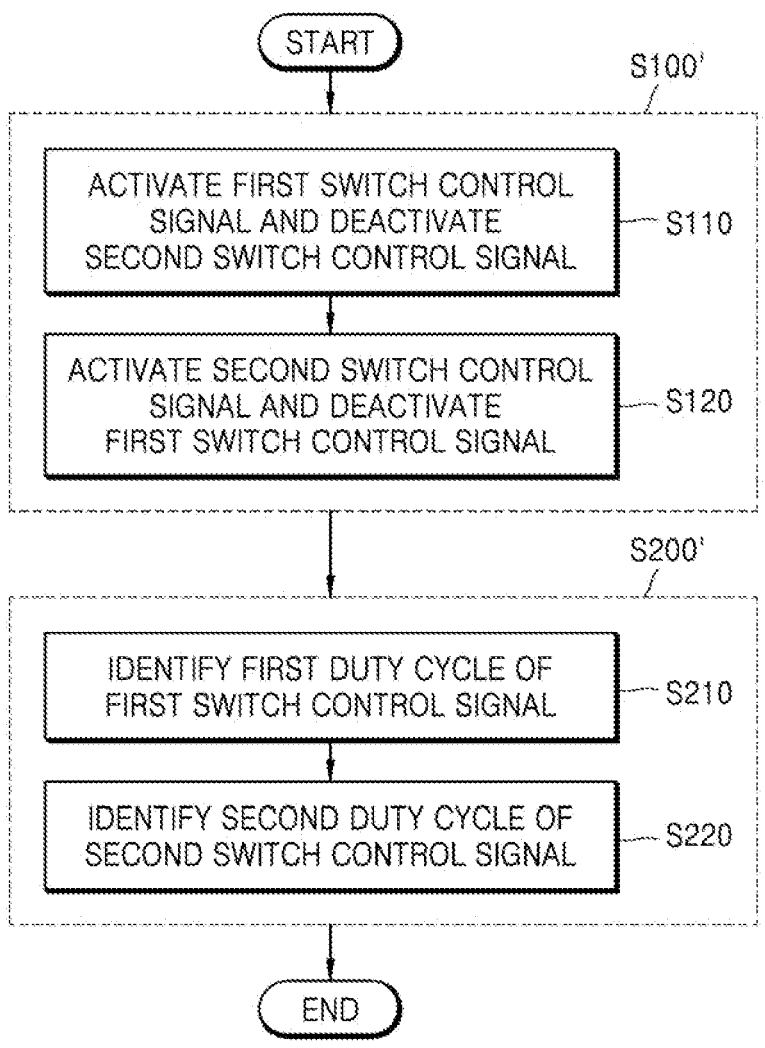
FIG. 11 is a flowchart illustrating a method of detecting a magnitude of an input current of a switching converter, according to an example embodiment.

FIG. 11 is a flowchart illustrating a method of detecting a magnitude of an input current of a switching converter, according to an example embodiment. For example, the flowchart of FIG. 11 illustrates examples of operation S100 and operation S200 of FIG. 10. In embodiments, as shown in FIG. 11, operation S100' may correspond to operation S100 of FIG. 10, and operation S200' may correspond to operation S200 of FIG. 10. As described above with reference to FIG. 11, the negative supply voltage $V_{SS}$ may be generated based on the first input current $I_{IN1}$ in operation S100' of FIG. 11, and a duty cycle may be identified in operation S200'. As illustrated in FIG. 11, operation S100' may include operation S110 and operation S120, and operation S200' may include operation S210 and operation S220. In some embodiments, operation S100' and operation S200' of FIG. 11 may be performed by the PMIC 30 of FIG. 3, and FIG. 11 will be described below with reference to FIGS. 3 and 4.

Referring to FIG. 11, in operation S110, the first switch control signal CTR1 may be activated and the second switch control signal CTR2 may be deactivated. For example, the controller 31_1 included in the first switching converter 31 may activate the first switch control signal CTR1 and deactivate the second switch control signal CTR2. Accordingly, as described above with reference to FIG. 4, the current $I_{SW1}$ passing through the first switch SW1 and the current $I_{L1}$ passing through the first inductor L1 may gradually increase, while the current $I_{SW2}$ passing through the second switch SW2 may be approximately zero.

In operation S120, the second switch control signal CTR2 may be activated and the first switch control signal CTR1 may be deactivated. For example, the controller 31_1 may deactivate the first switch control signal CTR1 and activate the second switch control signal CTR2. Accordingly, as described above with reference to FIG. 4, the current $I_{SW2}$ passing through the second switch SW2 and the current $I_{L1}$ passing through the first inductor L1 may be gradually reduced, while the current $I_{SW1}$ passing through the first switch SW1 may be approximately zero.

In operation S210, the first duty cycle D of the first switch control signal CTR1 may be identified. In some embodiments, at least one first signal SIG1 provided by the controller 31_1 to the first input current detector 33 may include a first signal having the same duty cycle as the duty cycle D of the first control signal CTR1. The first input current detector 33 may identify the first duty cycle D based on at least one first signal SIG1.

In operation S220, the second duty cycle D' of the second switch control signal CTR2 may be identified. In some embodiments, at least one first signal SIG1 provided by the controller 31_1 to the first input current detector 33 may include a first signal having the same duty cycle as the duty cycle D' of the second control signal CTR2. The first input current detector 33 may identify the second duty cycle D' based on at least one first signal SIG1.

Figure 12:
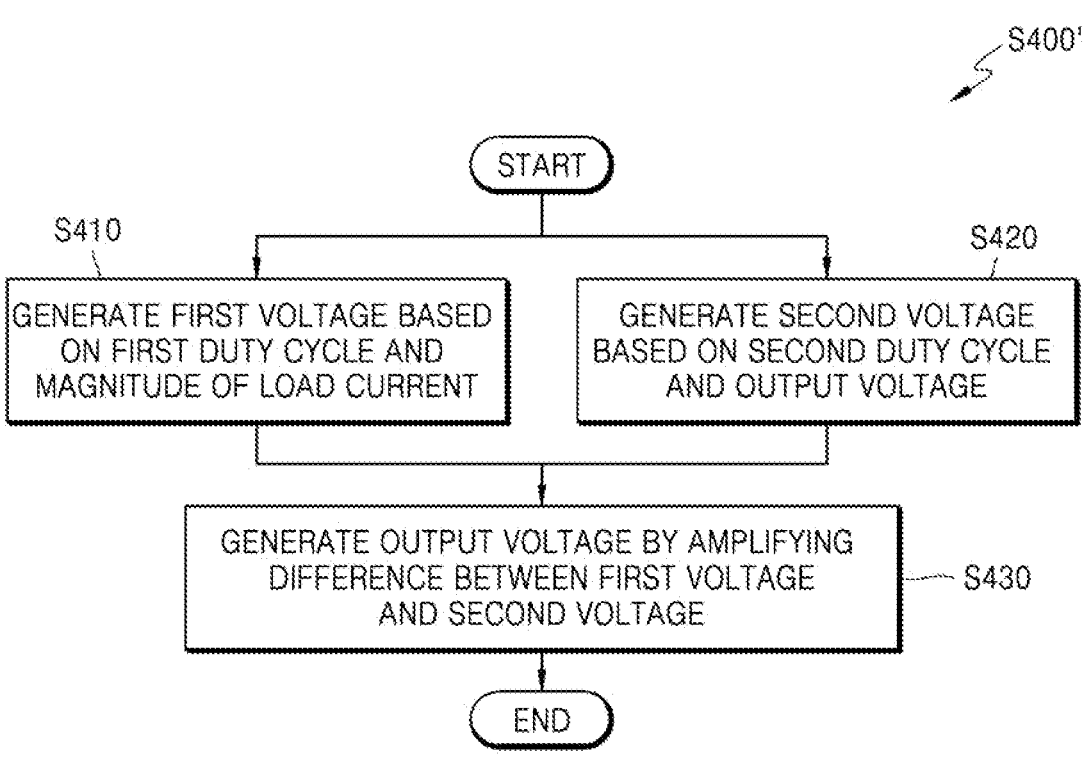
FIG. 12 is a flowchart illustrating a method of detecting a magnitude of an input current of a switching converter, according to an example embodiment.

FIG. 12 is a flowchart illustrating a method of detecting a magnitude of an input current of a switching converter, according to an example embodiment. For example, the flowchart of FIG. 12 illustrates an example of operation S400 of FIG. 10. As described above with reference to FIG. 10, a magnitude of the first input current $I_{IN1}$ may be detected in operation S400' of FIG. 12. In embodiments, as shown in FIG. 12, operation S400' may correspond to operation S400 of FIG. 10. As illustrated in FIG. 12, operation S400' may include a plurality of operations S410 to S430. In some embodiments, operation S400' may be performed by the first input current detector 50 of FIG. 5, and FIG. 12 will be described below with reference to FIG. 5.

Referring to FIG. 12, in operation S410, the first voltage $V_1$ may be generated based on the first duty cycle D and a magnitude of the load current $I_{LOAD}$. For example, the first input current detector 50 may generate the first voltage $V_1$ having a voltage level corresponding to a product of the first duty cycle D and the load current $I_{LOAD}$. An example of operation S410 will be described with reference to FIG. 13.

In operation S420, the second voltage $V_2$ may be generated based on the second duty cycle D' and the output voltage $V_{DET1}$. For example, the first input current detector 50 may generate the second voltage $V_2$ having a voltage level corresponding to a product of the second duty cycle D' and the load current $I_{LOAD}$. An example of operation S420 will be described with reference to FIG. 13.

In operation S430, the output voltage $V_{DET1}$ may be generated by amplifying a difference between the first voltage $V_1$ and the second voltage $V_2$. For example, the amplifier 55 may include a non-inverting input terminal receiving the first voltage $V_1$ and an inverting input terminal receiving the second voltage $V_2$. The output voltage $V_{DET1}$ of the amplifier 55 may be used to generate the second voltage $V_2$ in operation S420. Accordingly, as described above with reference to Equation 3, the output voltage $V_{DET1}$ may correspond to the magnitude of the first input current $I_{IN1}$.

Figure 13:
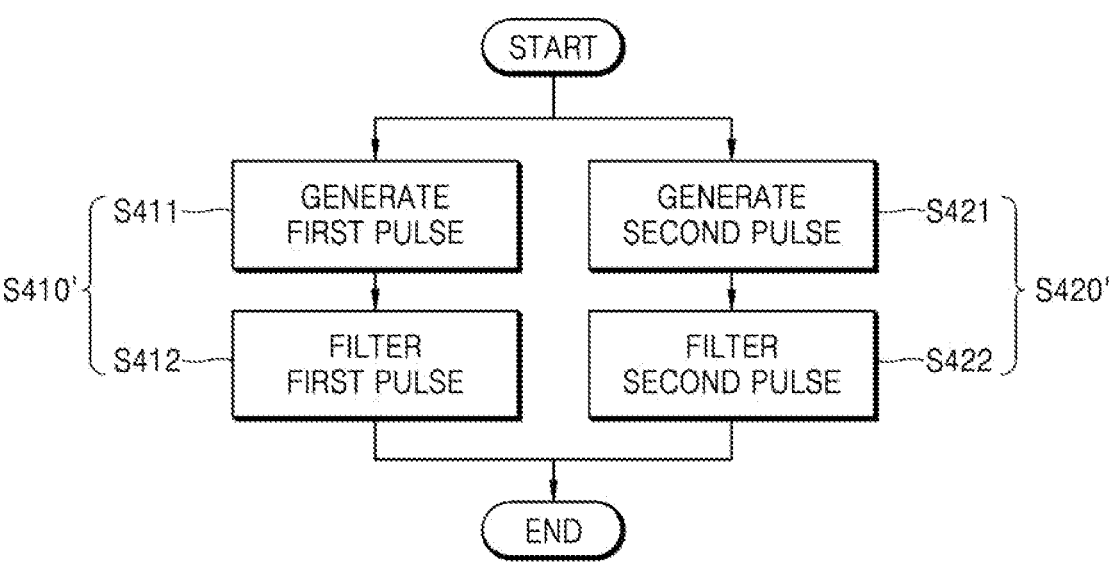
FIG. 13 is a flowchart illustrating a method of detecting a magnitude of an input current of a switching converter, according to an example embodiment.

FIG. 13 is a flowchart illustrating a method of detecting a magnitude of an input current of a switching converter, according to an example embodiment. For example, the flowchart of FIG. 13 illustrates examples of operation S410 and operation S420 of FIG. 12. In embodiments, as shown in FIG. 13, operation S410' may correspond to operation S410 of FIG. 12, and operation S420' may correspond to operation S420 of FIG. 12. As described above with reference to FIG. 12, the first voltage $V_1$ may be generated in operation S410' of FIG. 13, and the second voltage $V_2$ may be generated in operation S420' of FIG. 13. As illustrated in FIG. 13, operation S410' may include operation S411 and operation S412, and operation S420' may include operation S421 and operation S422. In some embodiments, operation S410' may be performed by the first pulse generator 71 and the first filter 72 of FIG. 7A, and operation S420' may be performed by the second pulse generator 73 and the second filter 74 of FIG. 7B. Hereinafter, FIG. 13 will be described with reference to FIGS. 7A and 7B.

Referring to FIG. 13, the first pulse PUL1 may be generated in operation S411. For example, the first pulse generator 71 may generate the first pulse PUL1 from the first signal SIG11 having the first duty cycle D, based on the voltage $V_{LD}$ having a magnitude corresponding to the load current $I_{LOAD}$. As described above with reference to FIG. 6, the first pulse PUL1 may have the first duty cycle D and have a peak corresponding to the voltage $V_{LD}$.

In operation S412, the first pulse PUL1 may be filtered. For example, the first filter 72 may include a low pass filter and may generate the first voltage $V_1$ by filtering the first pulse PUL1. Accordingly, the first voltage $V_1$ may have a voltage level corresponding to a product of the first duty cycle D and the load current $I_{LOAD}$.

In operation S421, the second pulse PUL2 may be generated. For example, the output voltage $V_{DET1}$ of the amplifier 55 of FIG. 5 may have a voltage level corresponding to the first input current $I_{IN1}$, and the second pulse generator 73 may generate the second pulse PUL2 based on the output voltage $V_{DET1}$ from the first signal SIG12 having the second duty cycle D'. As described above with reference to FIG. 6, the second pulse PUL2 may have the second duty cycle D' and have a peak corresponding to the output voltage $V_{DET1}$.

In operation S422, the second pulse PUL2 may be filtered. For example, the second filter 54 may include a low pass filter and generate the second voltage $V_2$ by filtering the second pulse PUL2. Accordingly, the second voltage $V_2$ may have a voltage level corresponding to a product of the second duty cycle D' and the output voltage $V_{DET1}$.

Figure 14:
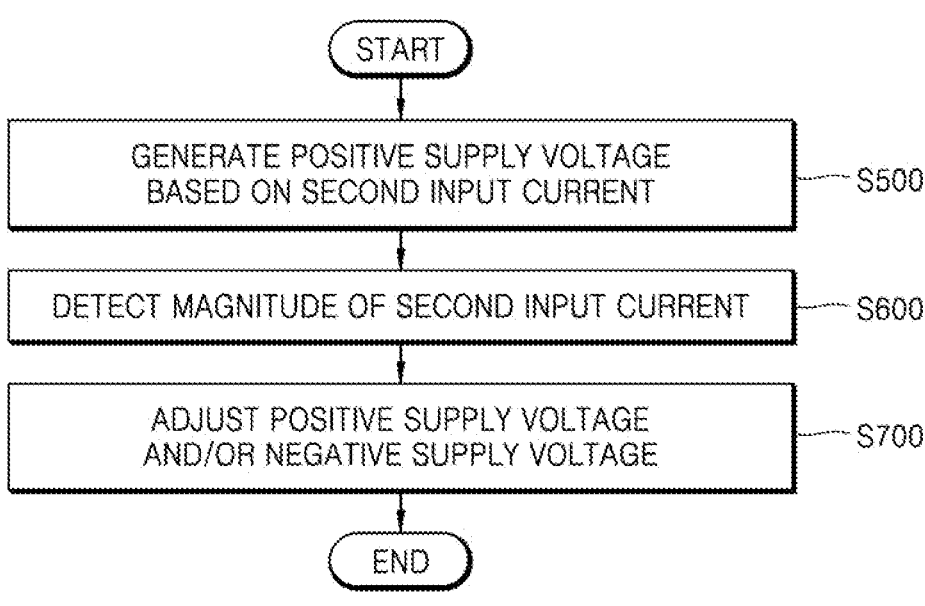
FIG. 14 is a flowchart illustrating a method of detecting a magnitude of an input current of a switching converter, according to an example embodiment.

FIG. 14 is a flowchart illustrating a method of detecting a magnitude of an input current of a switching converter, according to an example embodiment. For example, the flowchart of FIG. 14 illustrates a method of detecting a magnitude of the second input current $I_{IN2}$ of FIG. 1. In some embodiments, operation S500 and operation S600 of FIG. 14 may be performed in parallel with the method of FIG. 10, and operation S700 may be performed after the method of FIG. 10, operation S500, and operation S600 are performed. As illustrated in FIG. 14, the method of detecting the magnitude of the second input current $I_{IN2}$ may include a plurality of operations S500 to S700. In some embodiments, the method of FIG. 14 may be performed by the PMIC 20 of FIG. 2, as described below with reference to FIG. 2.

Referring to FIG. 14, the positive supply voltage $V_{DD}$ may be generated based on the second input current $I_{IN2}$ in operation S500. For example, the second switching converter 22 may output the positive supply voltage $V_{DD}$ through the fifth node N5 based on the second input current $I_{IN2}$ received through the fourth node N4. In some embodiments, the second switching converter 22 may be included in a boost converter.

In operation S600, a magnitude of the second input current $I_{IN2}$ may be detected. For example, the second input current detector 24 may receive at least one second signal SIG2 from the second switching converter 22 and detect the magnitude of the second input current $I_{IN2}$ based on at least one second signal SIG2. An example of operation S600 will be described below with reference to FIG. 15.

In operation S700, at least one of the positive supply voltage $V_{DD}$ and the negative supply voltage $V_{SS}$ may be adjusted. For example, the input current controller 26 may identify a magnitude of the input current IN based on the first detection signal DET1 received from the first input current detector 23 and the second detection signal DET2 received from the second input current detector 24 and control at least one of the first switching converter 21 and the second switching converter 22 based on the magnitude of the input current $I_{IN}$.

Figure 15:
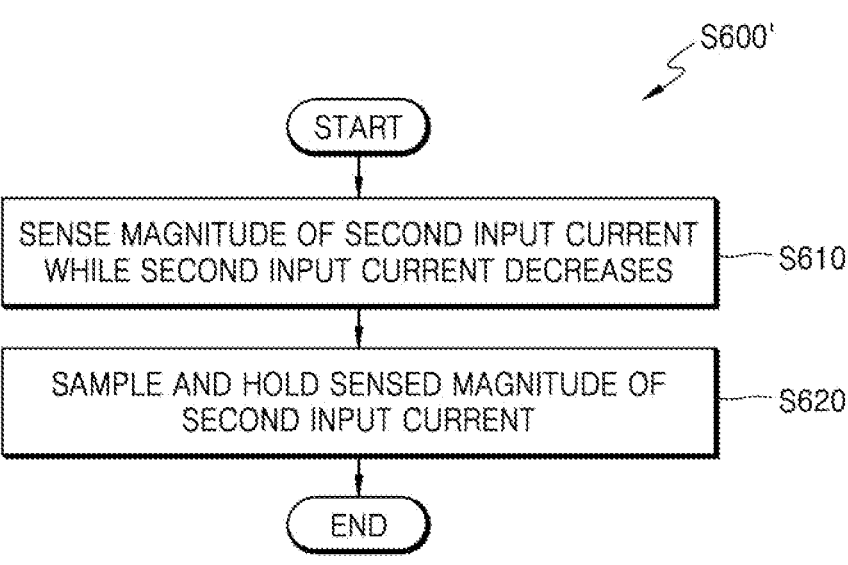
FIG. 15 is a flowchart illustrating a method of detecting a magnitude of an input current of a switching converter, according to an example embodiment.

FIG. 15 is a flowchart illustrating a method of detecting a magnitude of an input current of a switching converter, according to an example embodiment. For example, the flowchart of FIG. 15 illustrates an example of operation S600 of FIG. 14. As described above with reference to FIG. 14, the magnitude of the second input current $I_{IN2}$ may be detected in operation S600' of FIG. 15. In embodiments, as shown in FIG. 15, operation S600' may correspond to operation S600 of FIG. 14. As illustrated in FIG. 15, operation S600' may include operation S610 and operation S620. In some embodiments, operation S600' may be performed by the second input current detector 84 of FIG. 8, and FIG. 15 will be described below with reference to FIGS. 8 and 9.

Referring to FIG. 15, a magnitude of the second input current $I_{IN2}$ may be sensed while the second input current $I_{IN2}$ decreases in operation S610. For example, the second input current detector 84 may include the current sensor 84_1, and the current sensor 841 may sense a current $I_{SW4}$ passing through the fourth switch SW4. While the fourth switch SW4 is turned on, the third switch SW3 may be turned off, and thus, the second input current $I_{IN2}$ may pass through the fourth switch SW4. In embodiments, the second input current $I_{IN2}$ may correspond to the current $I_{SW4}$, for example such that $I_{SW4}=I_{IN2}$. Accordingly, the current sensor 841 may sense a magnitude of the second input current $I_{IN2}$ while the second input current $I_{IN2}$ decreases.

In operation S620, the sensed magnitude of the second input current $I_{IN2}$ may be sampled and held. For example, the second input current detector 84 may include the sample/hold circuit 84_2, and the sample/hold circuit 84_2 may identify a period in which a second input current decreases, based on at least one second signal SIG2 provided from the second switching converter 82. The sample/hold circuit 84_2 may sample and hold the sensed magnitude of the second input current $I_{IN2}$ in the identified period. Accordingly, the magnitude of the second input current $I_{IN2}$ may be detected.

Figure 16:
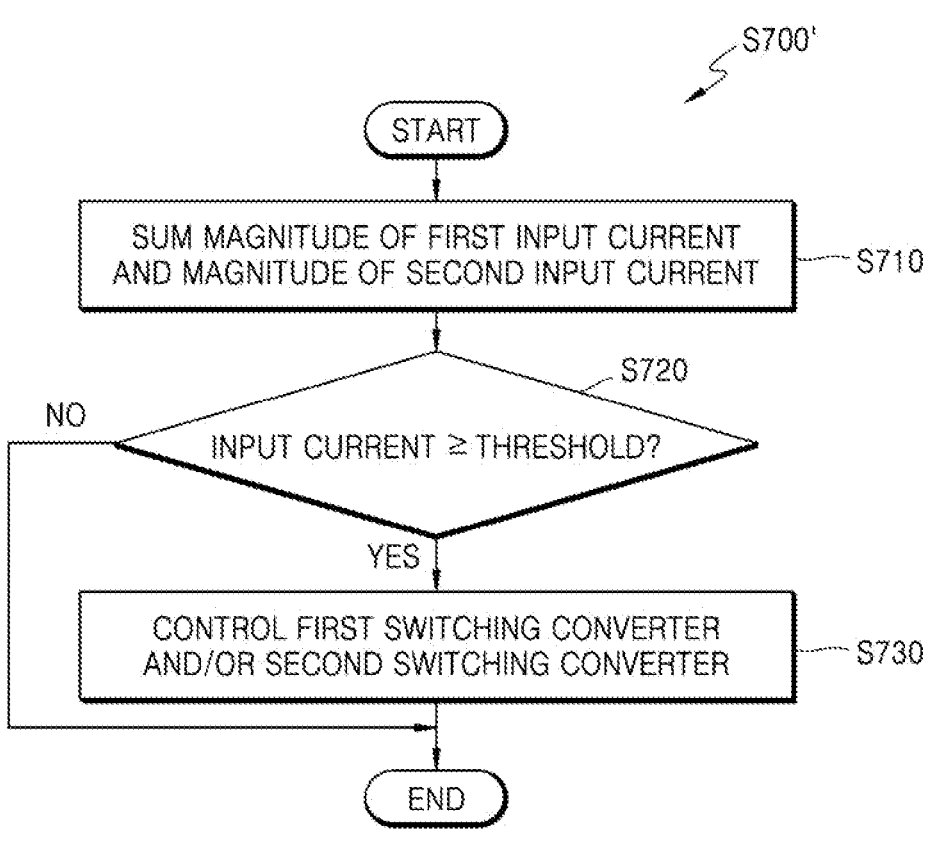
FIG. 16 is a flowchart illustrating a method of detecting a magnitude of an input current of a switching converter, according to an example embodiment.

FIG. 16 is a flowchart illustrating a method of detecting a magnitude of an input current of a switching converter, according to an example embodiment. For example, the flowchart of FIG. 16 illustrates an example of operation S700 of FIG. 14. In embodiments, as shown in FIG. 16, operation S700' may correspond to operation S700 of FIG. 14. As described above with reference to FIG. 14, the positive supply voltage $V_{DD}$ and the negative supply voltage $V_{SS}$ may be adjusted in operation S700' of FIG. 16. As illustrated in FIG. 16, operation S700' may include a plurality of operations S710 to S730. In some embodiments, operation S700' may be performed by the input current controller 26 of FIG. 2, and FIG. 16 will be described below with reference to FIG. 2.

Referring to FIG. 16, a magnitude of the first input current $I_{IN1}$ and a magnitude of the second input current $I_{IN2}$ may be summed in operation S710. For example, the input current controller 26 may identify the magnitude of the first input current $I_{IN1}$ based on the first detection signal DET1 received from the first input current detector 23 and may identify the magnitude of the second input current $I_{IN2}$ based on the second detection signal DET2 received from the second input current detector 24. The input current controller 26 may sum the magnitude of the first input current $I_{IN1}$ and the magnitude of the second input current $I_{IN2}$, and the sum may correspond to the magnitude of the input current Inv.

In operation S720, a determination may be made about whether an input current is greater than or equal to a threshold. For example, the input current controller 26 may determine whether the sum derived in operation S710 is greater than or equal to a threshold. As described above with reference to FIG. 1, when the input current $I_{IN}$ is excessively large, a voltage drop may occur due to the parasitic resistance $R_{PAR}$, and the input voltage $V_{IN}$ may be reduced. In order to prevent the input voltage $V_{IN}$ from decreasing, the input current controller 26 may determine whether the magnitude of the input current IN is greater than or equal to a threshold. As illustrated in FIG. 16, when the magnitude of the input current $I_{IN}$ is greater than or equal to the threshold, operation S730 may be subsequently performed, and when the magnitude of the input current $I_{IN}$ is less than the threshold, operation S700' may end.

In operation S730, at least one of the first switching converter 21 and the second switching converter 22 may be controlled. For example, the input current controller 26 may control the first switching converter 21 through the first adjustment signal ADJ1 or control the second switching converter 22 through the second adjustment signal ADJ2 in order to reduce the input current $I_{IN}$. In some embodiments, the first switching converter 21 may increase the negative supply voltage $V_{SS}$ in response to the first adjustment signal ADJ1, and the second switching converter 22 may be reduced the positive supply voltage $V_{DD}$ in response to the second adjustment signal ADJ2.

Figure 17:
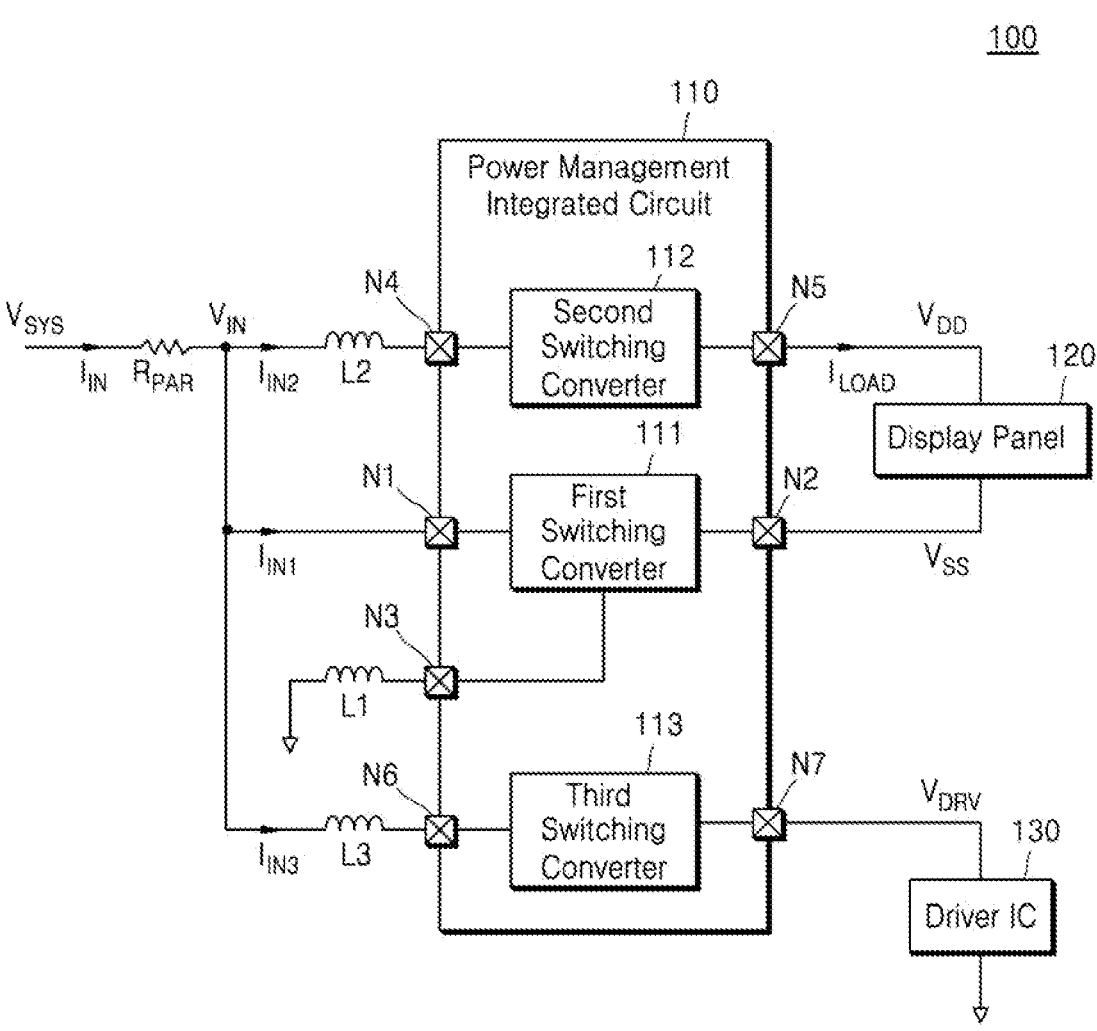
FIG. 17 is a block diagram illustrating a system according to an example embodiment.

FIG. 17 is a block diagram illustrating a system 100 according to an example embodiment. As illustrated in FIG. 17, the system 100 may include a PMIC 110, a display panel 120, a driver IC 130, and first to third inductors L1 to L3.

The display panel 120 may receive the positive supply voltage $V_{DD}$ and the negative supply voltage $V_{SS}$ from the PMIC 110 and consume the load current $I_{LOAD}$, like the load 5 of FIG. 1. The display panel 120 may use a high voltage, and thus, the PMIC 110 may generate the positive supply voltage $V_{DD}$ higher than the input voltage $V_{IN}$ and the negative supply voltage $V_{SS}$ lower than a ground potential. The driver IC 130 may drive the display panel 120 and receive a positive drive voltage $V_DRV$ higher than the input voltage $V_{IN}$ from the PMIC 110.

The PMIC 110 may include a first switching converter 111, a second switching converter 112, and a third switching converter 113. The first switching converter 111 may output the negative supply voltage $V_{SS}$ through a second node N2 based on a first input current $I_{IN1}$ received through a first node N1. The first switching converter 111 may be included in an inverting buck-boost converter together with the first inductor L1 connected to a third node N3. The second switching converter 112 may output the positive supply voltage $V_{DD}$ through a fifth node N5 based on a second input current $I_{IN2}$ received through a fourth node N4. The second switching converter 112 may include a boost converter together with the second inductor L2 connected to the fourth node N4. The third switching converter 113 may output the positive drive voltage $V_{DRV}$ through a seventh node N7 based on a third input current $I_{IN3}$ received through a sixth node N6. The third switching converter 113 may be included in a boost converter together with the third inductor L3 connected to the sixth node N6.

As described above with reference to the drawings, a magnitude of the first input current $I_{IN1}$ of the first switching converter 111, which generates the negative supply voltage $V_{SS}$, may be accurately detected. In addition, a magnitude of the second input current $I_{IN2}$ of the second switching converter 112, which generates the positive supply voltage $V_{DD}$, and a magnitude of the third input current $I_{IN3}$ of the third switching converter 113, which generates the positive drive voltage $V_{DRV}$, may each be accurately detected. Accordingly, the input current $I_{IN}$ corresponding to the sum of the first input current $I_{IN1}$, the second input current $I_{IN2}$, and the third input current $I_{IN3}$ may be accurately detected, an excessive voltage drop from the system voltage $V_{SYS}$ to the input voltage $V_{IN}$, due to the parasitic resistance $R_{PAR}$, may be prevented, and abnormal operations of at least one of the PMIC 110, the display panel 120, and the driver IC 130 may be prevented.

While embodiments have been particularly shown and described, it will be understood that various changes in form and details may be made therein without departing from the spirit and scope of the following claims.

What is claimed is:

1. A device comprising:
a first switching converter configured to generate a negative supply voltage based on an input voltage;
a load current sensor configured to sense a magnitude of a load current passing through a load to which the negative supply voltage is provided; and
a first input current detector configured to detect a magnitude of a first input current provided to the first switching converter based on a duty cycle of the first switching converter and the magnitude of the load current,
wherein the first input current detector comprises an amplifier configured to generate an output voltage by amplifying a difference between a first voltage corresponding to the magnitude of the load current and a second voltage corresponding to the magnitude of the first input current.

2. The device of claim 1, wherein the first switching converter is further configured to generate a first switch control signal which is activated while the first input current passes through an inductor, and a second switch control signal which is activated while the first switch control signal is deactivated, and
wherein the duty cycle of the first switching converter includes a first duty cycle of the first switch control signal and a second duty cycle of the second switch control signal.

3. The device of claim 2,
wherein the amplifier includes a non-inverting input terminal configured to receive the first voltage, wherein the first voltage corresponds to a product of the first duty cycle and the magnitude of the load current, and an inverting input terminal configured to receive the second voltage, wherein the first voltage corresponds to a product of the second duty cycle and the magnitude of the first input current.

4. The device of claim 3, wherein the first input current detector is further configured to generate the first voltage by filtering a first pulse,
wherein the first pulse has the first duty cycle,
wherein a peak of the first pulse is proportional to the magnitude of the load current,
wherein the first input current detector is further configured to generate the second voltage by filtering a second pulse,
wherein the second pulse has the second duty cycle, and
wherein a peak of the second pulse is proportional to a magnitude of the output voltage.

5. The device of claim 1, further comprising:
a second switching converter configured to generate a positive supply voltage which is provided to the load based on a second input current received through an inductor, wherein a voltage level of the positive supply voltage is higher than a voltage level of the input voltage; and
a second input current detector configured to detect a magnitude of the second input current.

6. The device of claim 5, wherein the second input current detector is further configured to detect the magnitude of the second input current while the second input current decreases.

7. The device of claim 6, wherein the second input current detector is further configured to sample and hold the detected magnitude of the second input current.

8. The device of claim 5, further comprising an input current controller configured to control at least one of the first switching converter and the second switching converter to reduce at least one of the first input current and the second input current based on a sum of the magnitude of the first input current and the magnitude of the second input current being greater than or equal to a threshold.

9. The device of claim 5, wherein the load current sensor is further configured to sense a magnitude of at least one of the load current received by the first switching converter and the load current output from the second switching converter.

10. A device comprising:
a first switching converter configured to:
generate a negative supply voltage based on an input voltage received through a first input node based on a duty cycle,
output the negative supply voltage to a first output node, and
output at least one signal having the duty cycle;
a load current sensor configured to generate a sense voltage, wherein a voltage level of the sense voltage corresponds to a magnitude of a load current passing through a load to which the negative supply voltage is provided; and
a first input current detector configured to detect a magnitude of a first input current received through the first input node based on the at least one signal and the sense voltage,
wherein the first input current detector comprises an amplifier configured to generate an output voltage by amplifying a difference between a first voltage corresponding to the magnitude of the load current and a second voltage corresponding to the magnitude of the first input current.

11. The device of claim 10, wherein the first switching converter comprises:

a first switch configured to provide a current from the first input node to an inductor based on an activation of a first switch control signal;

a second switch configured to provide a current from the first output node to the inductor based on an activation of a second switch control signal; and a first controller configured to generate the first switch control signal and the second switch control signal based on a voltage level of the sense voltage, and wherein the duty cycle of the at least one signal comprises at least one of a first duty cycle of the first switch control signal, a second duty cycle of the second switch control signal.

12. The device of claim 11, wherein the amplifier comprises a non-inverting input terminal configured to receive the first voltage, wherein the first voltage corresponds to a product of the first duty cycle and the sense voltage, and an inverting input terminal configured to receive the second voltage, wherein the first voltage corresponds to a product of the second duty cycle and the output voltage.

13. The device of claim 12, wherein the first input current detector comprises:

a first pulse generator configured to generate a first pulse, wherein the first pulse has the first duty cycle, and wherein a peak of the first pulse is proportional to the sense voltage;

a first filter configured to generate the first voltage by filtering the first pulse;

a second pulse generator configured to generate a second pulse, wherein the second pulse has the second duty cycle, and wherein a peak of the second pulse is proportional to the output voltage; and a second filter configured to generate the second voltage by filtering the second pulse.

14. The device of claim 10, further comprising a second switching converter configured to:

generate a positive supply voltage which is provided to the load based on a second input current received through an inductor and a second input node, wherein a voltage level of the positive supply voltage is higher than a voltage level of the input voltage, and output the positive supply voltage to a second output node; and a second input current detector configured to detect a magnitude of the second input current.

15. The device of claim 14, wherein the second switching converter comprises:

a third switch configured to provide the second input current to a ground node based on an activation of a third switch control signal;

a fourth switch configured to provide the second input current to the second output node in response to an activation of a fourth switch control signal; and a second controller configured to generate the third switch control signal and the fourth switch control signal based on a voltage level of the positive supply voltage, and wherein the second input current detector is further configured to detect the magnitude of the second input current while the fourth switch control signal is activated.

16. The device of claim 15, wherein the second input current detector comprises:

a current sensor configured to sense a magnitude of a current passing through the fourth switch; and a sample/hold circuit configured to sample and hold an output of the current sensor while the fourth switch control signal is activated.

17. The device of claim 14, further comprising an input current controller configured to control the first switching converter to reduce the first input current and/or the second switching converter to reduce the second input current based on a sum of the magnitude of the first input current and the magnitude of the second input current being greater than or equal to a threshold.

18. The device of claim 14, wherein the load current sensor is further configured to sense a magnitude of at least one of the load current received through the first output node and the load current output through the second output node.

19. A method comprising:

generating a negative supply voltage based on a first input current by controlling at least one switch based on a duty cycle;

identifying the duty cycle;

detecting a magnitude of a load current passing through a load to which the negative supply voltage is provided; and detecting a magnitude of the first input current based on the duty cycle and the magnitude of the load current using an amplifier configured to generate an output voltage by amplifying a difference between a first voltage corresponding to the magnitude of the load current and a second voltage corresponding to the magnitude of the first input current.

20. The method of claim 19, further comprising:

generating a positive supply voltage provided to the load based on a second input current received through an inductor;

detecting a magnitude of the second input current; and adjusting at least one of the positive supply voltage and the negative supply voltage based on a sum of the magnitude of the first input current and the magnitude of the second input current.

* * * * *